(12) United States Patent
Rygaard

(10) Patent No.: US 6,931,550 B2
(45) Date of Patent: Aug. 16, 2005

(54) MOBILE APPLICATION SECURITY SYSTEM AND METHOD

(75) Inventor: Christopher A. Rygaard, Sunnyvale, CA (US)

(73) Assignee: Aramira Corporation, Moffett Field, CA (US)

(*) Notice: Subject to any disclaimer, the term of this patent is extended or adjusted under 35 U.S.C. 154(b) by 510 days.

(21) Appl. No.: 09/758,941

(22) Filed: Jan. 10, 2001

(65) Prior Publication Data

US 2003/0037099 A1 Feb. 20, 2003

Related U.S. Application Data

(63) Continuation-in-part of application No. 09/645,028, filed on Aug. 23, 2000, which is a continuation-in-part of application No. 09/591,034, filed on Jun. 9, 2000, now abandoned.

(51) Int. Cl.[7] .............. G06F 11/30; G06F 15/173; G06F 15/16; G06F 9/44; H04L 9/00
(52) U.S. Cl. .............. 713/201; 713/161; 713/165; 713/194; 713/200; 709/223; 709/224; 709/225; 709/226; 709/227; 709/228; 709/229; 709/232; 709/238; 709/246; 717/108; 717/116; 717/126; 717/127
(58) Field of Search ............... 713/165, 161, 713/194, 200–201; 709/223–229, 232, 238, 246; 717/116, 108, 126–127

(56) References Cited

U.S. PATENT DOCUMENTS

| | | | |
|---|---|---|---|
| 5,633,932 A | | 5/1997 | Davis et al. |
| 5,850,516 A | | 12/1998 | Schneier |
| 5,850,517 A | * | 12/1998 | Verkler et al. ............ 709/202 |
| 5,963,731 A | | 10/1999 | Sagawa et al. |
| 5,968,176 A | | 10/1999 | Nessett et al. |
| 5,974,549 A | * | 10/1999 | Golan ...................... 713/200 |
| 6,009,456 A | * | 12/1999 | Frew et al. ............... 709/202 |
| 6,065,118 A | | 5/2000 | Bull et al. |
| 6,141,754 A | | 10/2000 | Choy |
| 6,148,327 A | * | 11/2000 | Whitebread et al. ....... 709/202 |
| 6,173,405 B1 | | 1/2001 | Nagel |
| 6,189,103 B1 | | 2/2001 | Nevarez et al. |
| 6,192,354 B1 | * | 2/2001 | Bigus et al. ............... 706/46 |
| 6,233,601 B1 | * | 5/2001 | Walsh ..................... 709/202 |
| 6,272,528 B1 | * | 8/2001 | Cullen et al. ............ 709/202 |
| 6,308,181 B1 | | 10/2001 | Jarvis |
| 6,539,416 B1 | | 3/2003 | Takewaki et al. |
| 6,615,232 B2 | * | 9/2003 | Suzuki et al. ............ 709/202 |
| 6,622,157 B1 | * | 9/2003 | Heddaya et al. ......... 709/202 |

FOREIGN PATENT DOCUMENTS

EP 0942370 A1 9/1999

OTHER PUBLICATIONS

Wong et al., Mar. 1999, Communications of the ACM, vol. 42, No. 3, p. 92–102.*

(Continued)

Primary Examiner—Ayaz Sheikh
Assistant Examiner—Jenise Jackson
(74) Attorney, Agent, or Firm—Fish & Richardson P.C.

(57) ABSTRACT

The mobile application security system and method in accordance with the invention increases the overall level of security in using a mobile application. In a preferred embodiment, the system may use a client/server architecture wherein each host of a mobile application is treated as a client and a central computer is treated as the server. In operation, any time that a mobile application is going to jump between hosts, it must first pass through the central computer so that the central computer may perform various security checks. The security checks ensure that the security of the mobile application is not compromised and overcomes the above problems with typical mobile application systems.

24 Claims, 19 Drawing Sheets

OTHER PUBLICATIONS

Tahara et al., ICSE 1999, ACM, p. 356–367.*

Peter Mell et al., "A Denial of Service Resistant Intrusion Detection Architecture", NIST, 2000.

Peter Mell et al., "Mobile Agent Attach Resistant Distributed Hierarchical Intrusion Detection" NIST, 1999.

W.A. Jansen, "A Privilege Management Scheme for Mobile Agent Systems", NIST.

Wayne Jansen, "Countermeasures for Mobile Agent Security", NIST.

Wayne Janson et al., "Applying Mobile Agents to Intrusion Detection and Response" NIST Interim Report, Oct. 1999.

Wayne Janson et al., "Privilege Management of Mobile Agents", NIST.

Wayne Jansen et al., "NIST Special Publication 800–19—Mobile Agent Security", NIST.

W.A. Jansen, "A Privilege Management Scheme for Mobile Agent Systems" NIST May 2001.

Wayne Jansen, "Countermeasures for Mobile Agent Security", NIST Nov. 2000.

Wayne Jansen et al., "Privilege Management of Mobile Agents", NIST Oct. 2000.

W. Jansen, "Intrusion Detection with Mobile Agents" Computer Communications Journal, Special Issue On Intrusion Detection Oct. 2, 2001.

"Jumping Beans™ White Paper" Ad Astra Engineering, Incorporated Dec. 1998.

*Intrusion Detection with Mobile Agents*, Computer Communications Journal, Special Issue oN Intrusion Detection, Jansen.

*Determining Privileges of Mobile Agents*, Proceedings of the Computer Security Applications Conference, Dec. 2001. Jansen.

*Mobile Agent Security*, NIST Special Publication 800–19, Aug. 1999. Jansen et al.

*Agents for the Masses: Is it Possible To Make Development of Sophisticated Agents Simple Enough To Be Practical?* IEEE Intelligent Systems, Special Issue on Agents, May–Jun., 1999. Bradshaw et al.

*Network Security Testing Using Mobile Agents* Third International Conference and Exhibition on the Practical Application of Intelligent Agents and multi–Agent Technology. London, UK Mar. 1998. Karygiannis.

*A Framework For Multi–Mode Authentication: Overview and Implementation Guide.* NISTIR 7046 Aug. 2003. Jansen et al.

*Picture Password: A Visual Login Technique for Mobile Devices.* NISTIR 7030, Jul. 2003. Jansen et al.

*Security Policy Management for Handheld Devices.* The Int'l. Conference on Security and Management (SAM'03), Jun. 2003. Jansen et al.

*Authenticating Users on Handheld Devices*, Proceedings of the Canadian Information Technology Security Symposium, May 2003. Jansen.

*Policy Expression and Enforcement for Handh eld Devices*, NISTIR 6981, May 2003. Jansen et al.

*Assigning and Enforcing Security Policies on Handheld Devices*, Proceedings of the Canadian Information Technology Security Symposium, May 2002. Jansen et al.

PCT International Search Report dated Jan. 2, 2003 corresponding to PCT US02/21186.

Office Action dated Dec. 18, 2003 for U.S. Appl. No. 09/764,548 filed Jan. 18, 2001.

Office Action dated Dec. 22, 2003 for U.S. Appl. No. 09/591,034 filed Jun. 9, 2000.

Office Action dated Dec. 31, 2003 for U.S. Appl. No. 09/645,028 filed Aug. 23, 2000.

* cited by examiner

MOBILE APPLICATION SECURITY SYSTEM AND METHOD

RELATED APPLICATION

This application is a continuation in part of U.S. patent application Ser. No. 09/645,028, filed Aug. 23, 2000 and entitled "Mobile Application Security System and Method" which is a continuation in part of U.S. patent application Ser. No. 09/591,034, filed Jun. 9, 2000 now abandoned and entitled "Mobile Application Security System and Method" which is owned by the same assignee as the present invention.

BACKGROUND OF THE INVENTION

This invention relates generally to a system and method for enhancing the operation and security of a software application and in particular to a system and method for improving the security of a mobile software application.

In traditional computing systems, communication between computers is either code (a software application) or data (a file containing information) and there is no notion of a program moving between hosts while it is being executed. Thus, with a typical computing system, a person may execute a software application (e.g., Microsoft Word) on his own computer and then forward the results of the execution of the software application (e.g., a Word document) to another user. The other user may then view the Word document by executing his own copy of Microsoft Word. A user may also send another user an executable software application file that the other user may download and execute on his own computer. However, these traditional computing systems do not recognize a single instantiation of a software program that may be executed by one or more different computers in order to complete the execution of the software application.

A mobile application, sometimes also called a mobile app or a mobile agent, is a currently executing computer software application/program, or part of a currently executing computer program that can physically move from one computer to another (between hosts) while it is being executed: A mobile application's software may or may not have been previously installed on a particular computers prior to the arrival of the mobile application. The mobile applications are said to jump from one computer to another computer and the process of jumping from one computer to another computer is also referred to as a jump.

The process of initiating a jump between computers is commonly known as a dispatch. Typically, each mobile application will carry with it an ordered list or tree of hosts which the mobile application must visit during its execution, and such a list or tree is called the mobile application's itinerary. An example of a mobile application and it itinerary is described below with reference to FIG. 2. The computers that can receive and dispatch mobile applications are called hosts. The collection of hosts, computer networks, and software which executes and supports the mobile applications, and the mobile applications themselves, is called the mobile application system.

A mobile application typically has at least two parts: the state and the code. The state of the mobile application contains all of the data stored, carried, and/or computed by the particular mobile application. The code of the mobile application is the set of computer instructions which the host computer is intended to carry out on behalf of the mobile application during the execution of the mobile application by the particular host computer. In addition, a mobile application may have other parts, including an Access Control List (ACL), an itinerary, a datastore, an audit log, etc.

The problem faced by software products that support mobile applications are insurmountable security problems. In particular, there are three problems that are most often cited:

1) An hostile host can send code with undesirable behavior to another host. Currently, there is no way to ensure that an hostile host cannot inject unsafe code into the mobile application system.

2) A mobile application cannot be protected from a hostile host. In particular, when a mobile application arrives at a host and begins execution, that mobile application is at the mercy of the host. In other words, there is no guarantee that the host will execute the computer instructions properly. There is not even any guarantee that the host will run any particular software at all; and 3) A mobile application cannot be securely sent to or received from a host outside of a group of trusted computers, known as the Trusted Computing Base (TCB).

A Trusted Computing Base (TCB) is the collection of computers, computer peripherals, and communication networks which must perform all requested operations properly, and must not perform extraneous operations, and are trusted to do so, in order to properly complete whatever computations are required. A host outside of the TCB can perform nefarious tasks on the mobile application. This nefarious behavior cannot be controlled, and it cannot be detected. Therefore, once a mobile application has visited an untrusted host, it could be altered in an undesirable way, and therefore is a security hazard. In addition, the mobile application that visited the untrusted host can no longer be trusted to execute within the TCB. All of these security problems with mobile application need to be overcome before mobile applications become more accepted as an alternative to traditional computing systems. Thus, it is desirable to provide a mobile application security system and method that overcomes the above problems and limitations with conventional mobile application systems and it is to this end that the present invention is directed so that mobile applications may be used in most financial, commercial, and military computer systems.

SUMMARY OF THE INVENTION

The mobile application security system and method increases the overall level of security in using a mobile application. In a preferred embodiment, the system may use a client/server architecture wherein each host of a mobile application is treated as a client and a central computer is treated as the server. In operation, any time that a mobile application is going to jump between hosts, it must first pass through the central computer so that the central computer may perform various security checks. The security checks ensure that the security of the mobile application is not compromised and overcomes the above problems with typical mobile application systems. In accordance with the preferred embodiment of the invention, the security system in accordance with the invention may detect unwanted changes in the code of the mobile application by comparing the mobile application received from the sending host with a copy of the mobile application in the central computer. This ensures that a host cannot accidentally or purposely inject some unwanted code, such as a virus, into the mobile application. In accordance with another embodiment of the invention, the security system may prevent hostile or untrusted hosts from transmitting code to the other hosts in the mobile application system. In accordance with yet another embodiment of the invention, the security system may prevent unwanted changes to the code of the mobile application. In yet another embodiment, the system may prevent unwanted changes in the itinerary of the mobile application. In yet another embodiment, the system may prevent untrusted hosts from initially launching mobile applications.

Thus, in accordance with the invention, a mobile application security system and method are provided wherein the system comprises a central computer for controlling the security of a mobile application system; one or more host computers connected to the server computer wherein each host computer executes the mobile application that jumps between the hosts during execution. The central computer further comprises means for monitoring the security of the mobile application as it jumps between the host computers wherein when the mobile application is communicated from a first host to a second host, it passes through the central computer. In accordance with one embodiment of the invention, the security monitoring further comprises means for detecting unwanted changes in the code associated with the mobile application when the mobile application is jumping between hosts.

In accordance with another embodiment of the invention, the security monitoring further comprises means for preventing a host from transmitting hostile code in a mobile application to another host. In accordance with yet another embodiment of the invention, the security monitoring further comprises means for detecting unwanted changes in the state of the mobile application. In accordance with yet another embodiment of the invention, the security monitoring further comprises means for detecting unwanted changes in the itinerary of the mobile application. In accordance with yet another embodiment of the invention, the security monitoring comprises means for preventing untrusted hosts from initially launching mobile applications.

DETAILED DESCRIPTION OF A PREFERRED EMBODIMENT

The invention is particularly applicable to a client-server based mobile application security system and it is in this context that the invention will be described. It will be appreciated, however, that the system and method in accordance with the invention has greater utility since it may be used with web-based systems for example.

Figure 1:
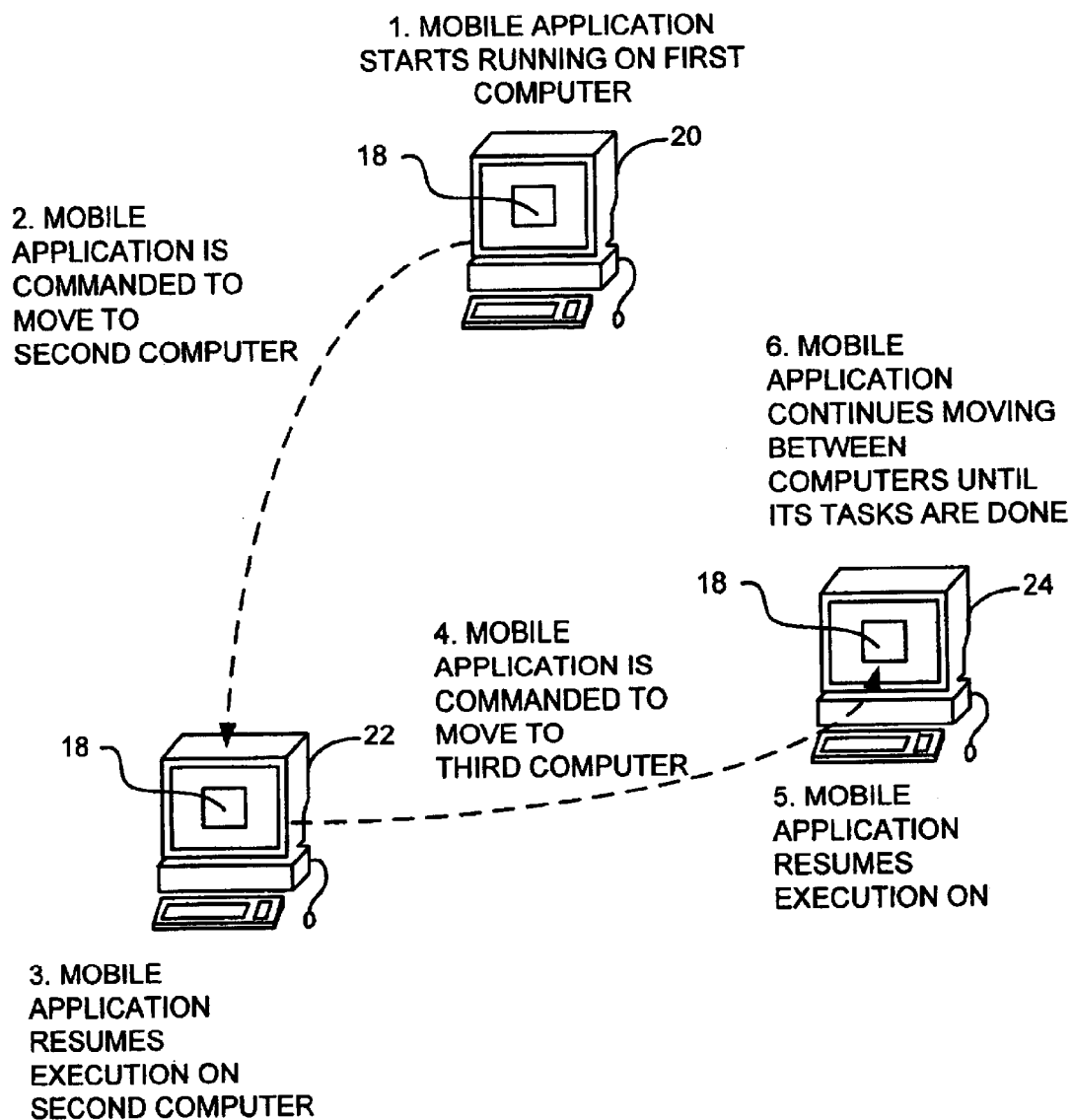
FIG. 1 is a diagram illustrating a typical mobile application and its operation.

FIG. 1 is a diagram illustrating a typical mobile application 18 and its operation. In particular, the mobile application may start its execution on a first computer 20. At some point, the mobile application 18 is instructed to move to a second computer 22 and the mobile application jumps to the second computer. Once at the second computer, the mobile application resumes its execution on the second computer. At some later time, the mobile application is instructed to move to a third computer 24 and the mobile application jumps to the third computer and resumes its execution on the third computer. In this manner, the mobile application can execute on one or more different computers at different times. To understand the concept of a mobile application, an example of a typical mobile application will now be provided.

Figure 2:
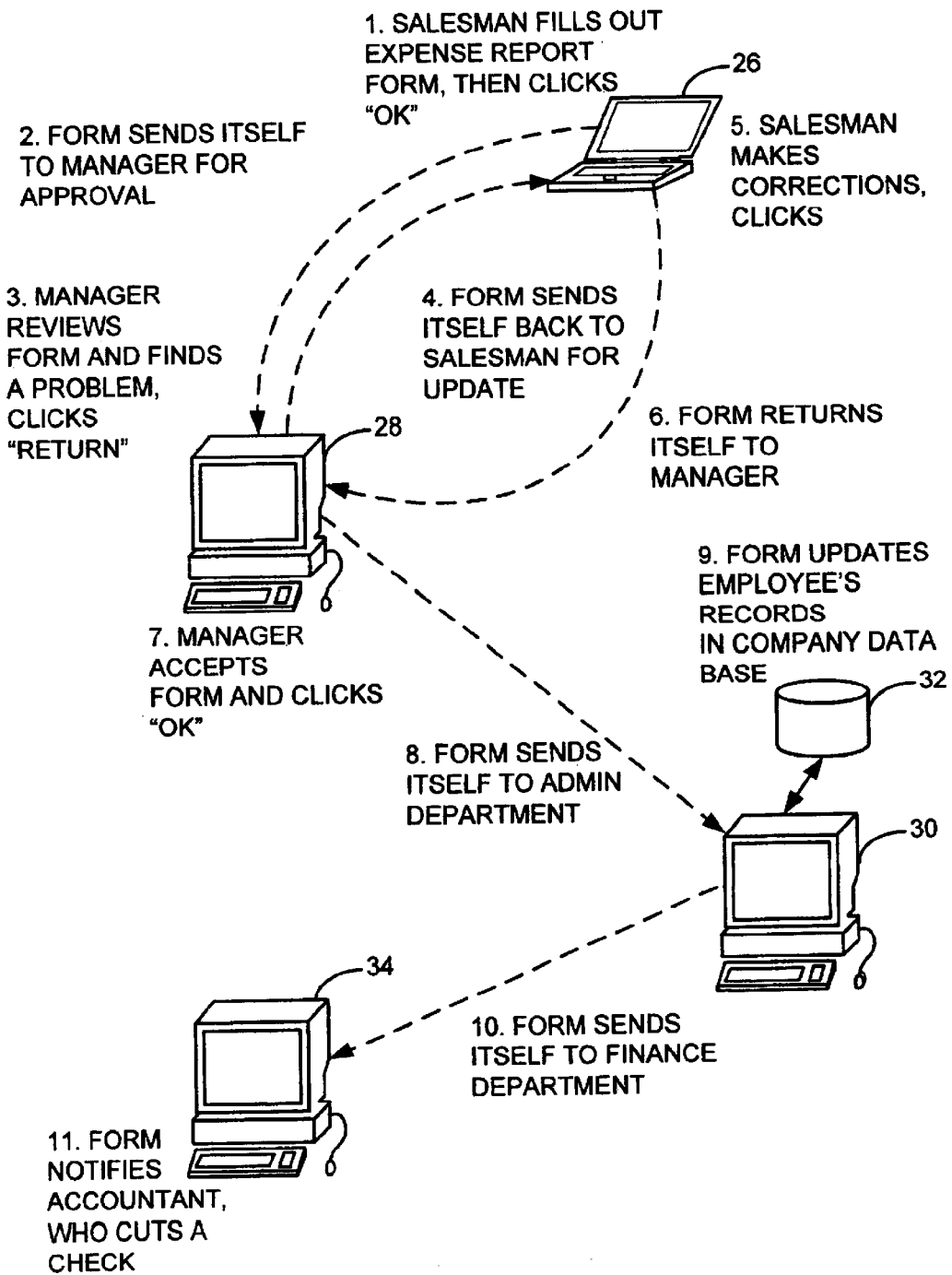
FIG. 2 is a diagram illustrating an example of a typical mobile application.

FIG. 2 is a diagram illustrating an example of a typical mobile application and in particular, an intelligent expense report form. In this example, the mobile application facilitates the expense report process by automatically performing some functions. In particular, a salesman at a laptop computer 26 may initially fill out an expense report form and click OK when the expense report is ready. Automatically, the mobile application then sends itself to a manager's computer 28 for approval by the manager. In this example, the manager finds a problem with the form and returns it to the salesman so that the form automatically sends itself back to the salesman for an update. Next, the salesman makes the necessary corrections and clicks OK to send it automatically back to the manager. With the further updates, the manager accepts the expense form and clicks "OK". The mobile expense report form then automatically sends itself to a computer 30 in the administration department. The mobile expense form then executes on the administration computer and updates a database 32 with the new information in the expense form. Next, the mobile expense report automatically sends itself to a computer 34 of the accountant. The mobile expense report then automatically starts to execute on the accountant's computer and notifies the accountant that a check is needed so that the accountant can cut the check for the salesman. Thus, the mobile application has automated much of the expense report submission process so that the people involved in the process do not have to worry about ensuring that the expense report is approved. To better understand the problems associated with the typical mobile application, an example of the movement of the typical mobile application will be described in more detail.

Figure 3:
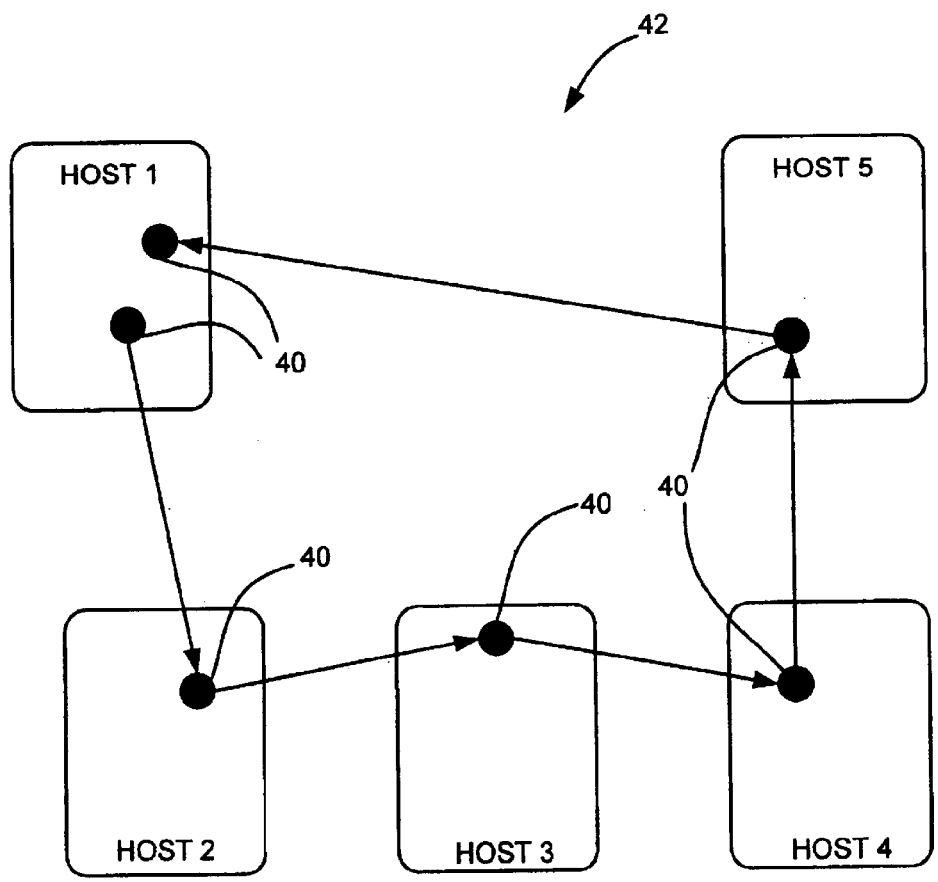
FIG. 3 is a diagram illustrating the movement of a mobile application in a conventional peer-to-peer mobile application system.

FIG. 3 is a diagram illustrating the movement of a mobile application 40 in a conventional peer-to-peer mobile application system 42. In this example, the system 42 may include one or more host computers, such as Host1, Host2, Host3, Host4 and Host5, that execute the mobile application are different times as the mobile application jumps between the hosts as is well known. As shown in FIG. 3, the mobile application 40 may jump directly from one host to another host such that there is never a central repository for information about the mobile application. Thus, a noted problem with the mobile application from Host 1 may never be known by the other Hosts. In addition, any of the Hosts in the system 42 may sabotage or alter the mobile application to perform some nefarious act, such as placing a virus into the mobile application. It is desirable to provide a system wherein the hosts and the mobile application are protected from attacks and the invention solves these problems as will now be described.

Figure 4:
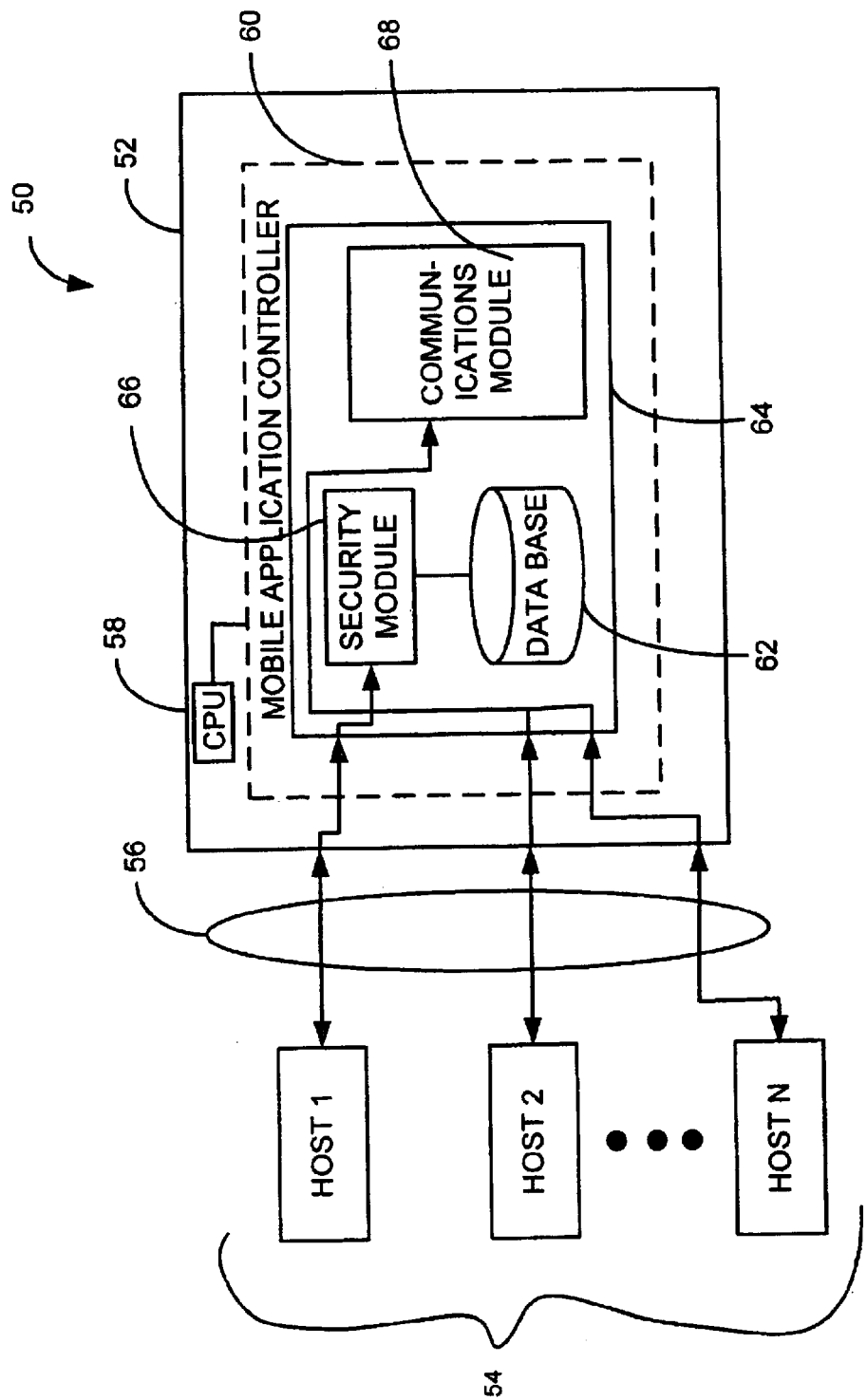
FIG. 4 is a diagram illustrating a client/server mobile application security system in accordance with the invention.

FIG. 4 is a diagram illustrating a client/server mobile application security system 50 in accordance with the invention. In particular, the system may include a server computer 52 and one or more host computers 54, such as Host 1, Host 2 and Host N, that may be connected to the server computer by a computer network 56, such as a wide area network, the Internet, the World Wide Web, a telephone line and a modem or the like. The computer network permits the server and hosts to communicate data between each other. Each host may be a typical computer system that includes a CPU and a memory for executing a software application such as a mobile application.

The server 52 may include a CPU 58 and a memory 60 along with a persistent storage device (not shown) for permanently storing one or more software applications or modules that may be executed by the CPU by loading the software applications or modules into the memory. The server may also include a database 62 that stores one or more mobile applications along with information about the mobile applications as described below. As shown, the memory of the server has a mobile application controller module 64 stored in it that, when executed by the CPU, control the security of the mobile applications and hosts as described below. In a preferred embodiment, the mobile application controller 64 may be one or more software application or modules, but the controller may also be implemented using hardware.

In a preferred embodiment, the mobile application controller 64 may include security software 66 and a communications software 68. The combination of the software may solve the problems with typical mobile application systems so that: 1) A hostile host cannot send code with undesirable behavior to another host; 2) A mobile application can be protected from a hostile host; and 3) A mobile application can be securely sent to or received from a host outside of a group of trusted computers, known as the Trusted Computing Base (TCB) without fear of hostile activity. The way in which the security system in accordance with the invention overcomes these problems will now be described.

Figure 5:
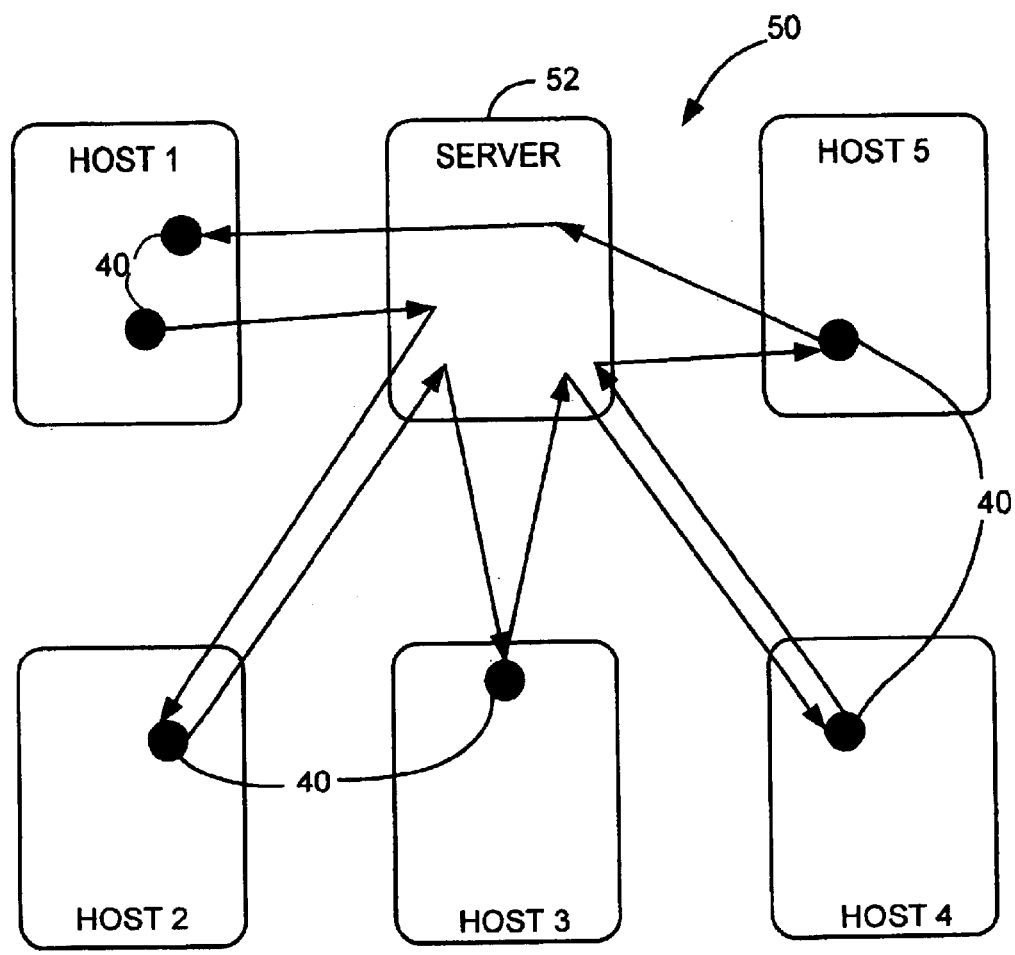
FIG. 5 is a diagram illustrating the operation of the mobile application security system of FIG. 4.

FIG. 5 is a diagram illustrating the operation of the mobile application security system 50 of FIG. 4. In particular, the security system 50 in accordance with the invention uses a client/server based security model as opposed to the typical peer-to-peer arrangement as shown in FIG. 3. Thus, using the security system 50 in accordance with the invention, there is centralized server 52 which is not a host for the mobile applications, but acts as a server for the participating hosts (Host1, Host2, Host3, Host4 and Host 5 in this example) that are the clients. Thus, in accordance with the invention, each of these clients (Hosts) communicates with only the server and never directly with each other. Thus, as shown in FIG. 5, the mobile application 40 must pass through the server on each jump between the hosts.

Figure 6:
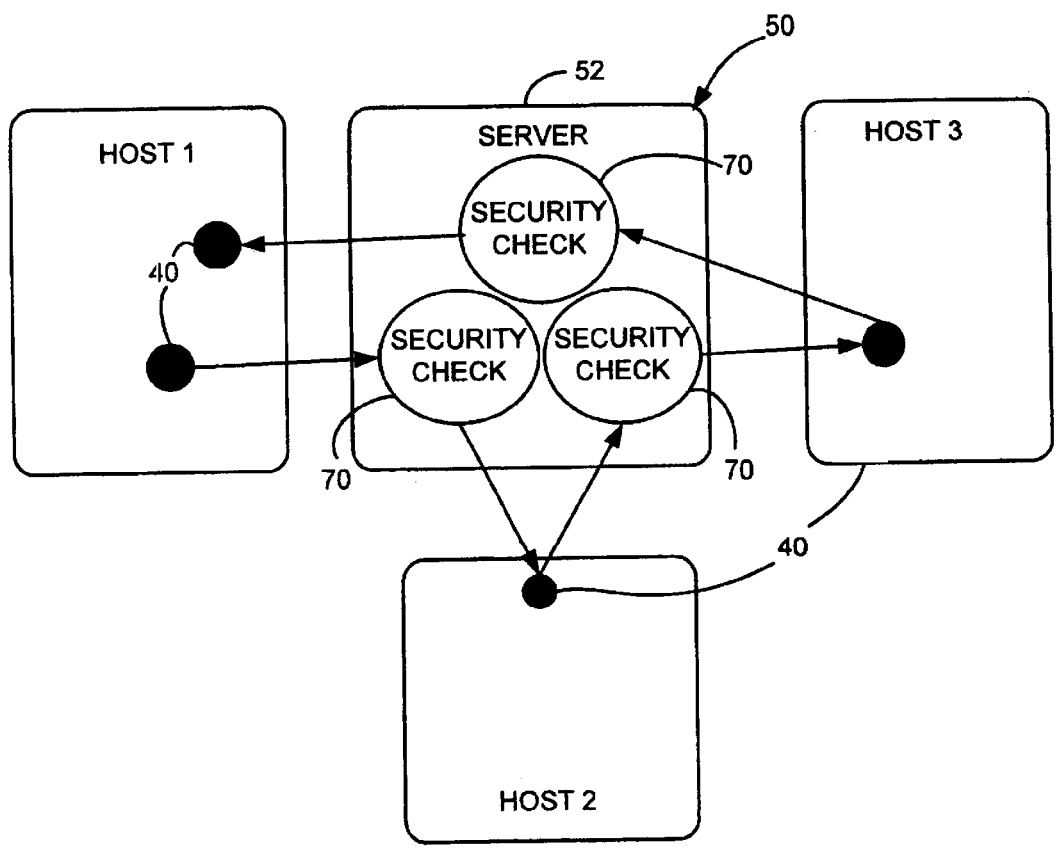
FIG. 6 is a diagram illustrating more details of the mobile application security system shown in FIG. 5.

FIG. 6 is a diagram illustrating more details of the mobile application security system 50 shown in FIG. 5. In particular, the client/server architecture of the security system in accordance with the invention ensures that the server tracks all of the mobile applications in the system and all of the jumps of all of the mobile applications. The server 52 may also perform security procedures on the mobile applications while they are in transit. Thus, for example, a security check 70 may be performed by the security module of the server each time a mobile application jumps from one host to another host as shown in FIG. 6.

The security system 50 in accordance with the invention provides many advantages over the typical mobile application systems. For example, the necessary and feasible security procedures which the server can perform to ensure the security of the mobile application system are provided that raise the level of security of the mobile application system sufficiently to allow deployment in most computer systems. The system may also perform and generate certain responses to a failure of security checks as described below.

In accordance with the invention, since any mobile application must jump to the server between each host, the server may capture and record the entire mobile application during each jump. Then, on subsequent jumps, the server can compare the previously saved mobile application with the new (and potentially changed) mobile application to detect unwanted tampering by each host. The above is just one example of the security checks that can be performed by the server and the server may also perform other security checks as described below. As another example, if the code or data of a mobile application is marked as immutable, then the server may simply assume that the code or data has been altered (without necessarily checking it) and replace the current code or data with code or data that is known to be safe. In particular, five different embodiments will be described. Now, a first embodiment of the security system (referred to as "Jumping Beans") will be described that prevents/detects unwanted changes in the mobile application code.

In accordance with the invention, the system may detect unwanted changes in the code of a mobile application and strip unsafe code from mobile applications by a combination of three different processes: 1) never retrieving code from untrusted hosts, (2) preventing untrusted hosts from forwarding code, and (3) marking mobile applications as having immutable code. With Jumping Beans, each participating host can be marked to operate in one of two ways: 1) The host cannot inject any code into the mobile application system, except for code which the host provides for execution on itself, or 2) All code supplied by the host can be propagated to other hosts in the mobile application system. The hosts are marked this way from the server, so the server is aware of how each host is marked. An example of the implementation of the invention will now be described.

Never Retrieve Code from Untrusted Hosts

Figure 7:
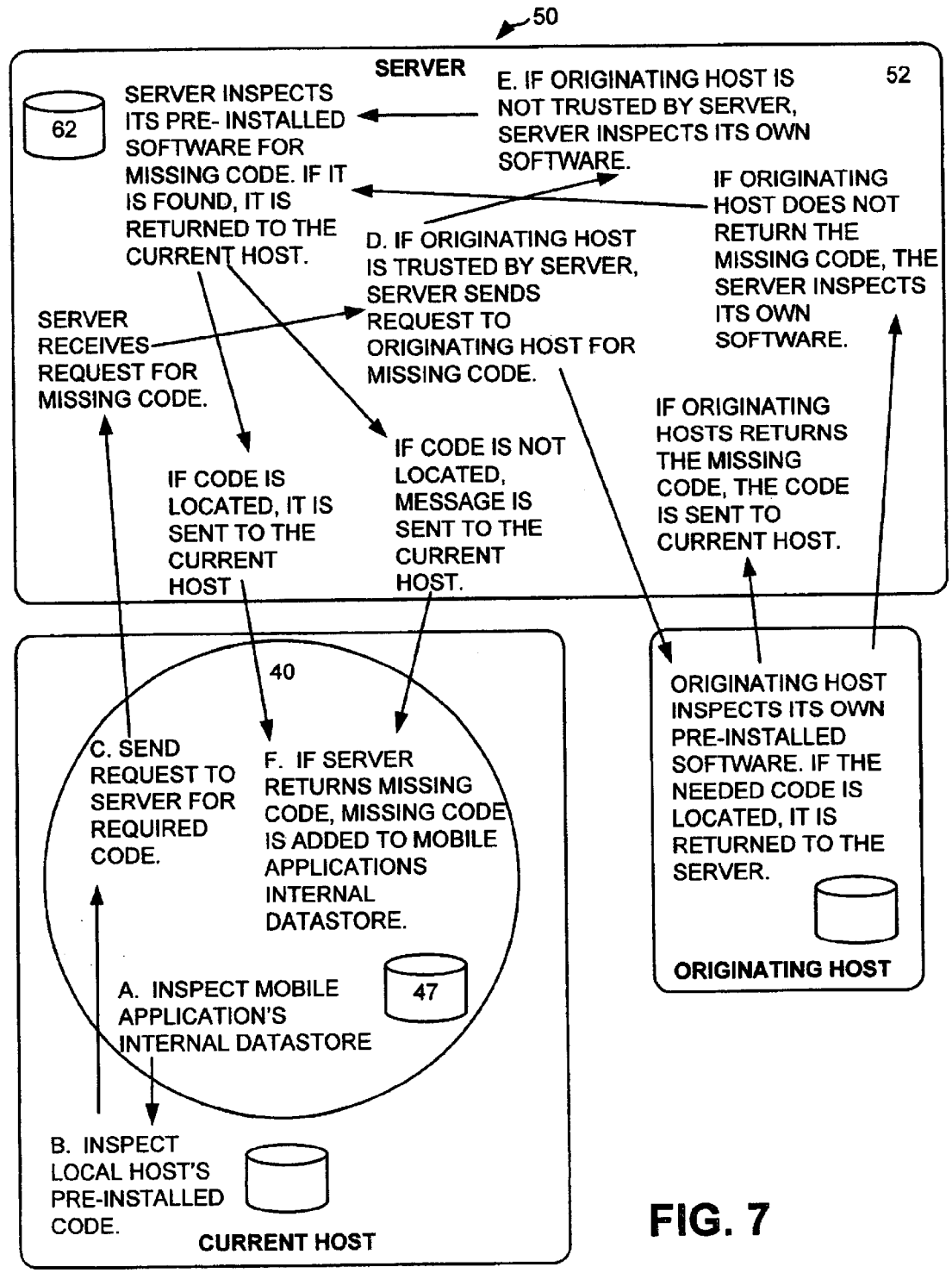
FIG. 7 is a diagram illustrating an example of the process for never retrieving code from an untrusted host.

Jumping Beans mobile applications do not necessarily carry with them all of the code needed for execution. Jumping Beans implements a protocol for retrieving any code which the mobile application might require, and this protocol is part of the implementation:

a. The mobile application inspects its own internal datastore 47 to see if the required code is available there. If it is, the mobile application uses it and searches no further.

b. If the mobile application cannot find the requested code in its own datastore, the mobile application queries the local host for the code. The local host inspects its own pre-installed software to determine if the requested code is available there. If it is, the mobile application uses it and searches no further.

c. If the mobile application cannot find the requested code, it forms a request for the requested code which is sent to the server.

d. The server then checks the host from which the mobile application originated. If this host is marked as allowed to inject code into the mobile application system, then the server sends a request to the originating host for the requested code. If the requested code is found there, the server forwards the code to the mobile application and skips the next step.

e. If the originating host is marked as unable to inject code into the mobile application system, or if the originating host does not have the requested code, then the server inspects its own previously installed software to see if the requested code is available from the server. If it is available from the server, the requested code is forwarded to the mobile application.

f. If the mobile application retrieves the requested code from the server (either from the originating host or from software pre-installed on the server), then the mobile application stores the retrieved code in its own datastore so that it will not need to be retrieved in the future.

g. If the mobile application retrieves the requested code from the server (either from the originating host or from software pre-installed on the server), then the mobile application uses that code and searches no further.

h. If the mobile application cannot retrieve the requested code from the server, then an exception is raised. FIG. 7 illustrates an example of the above process.

Figure 7A:
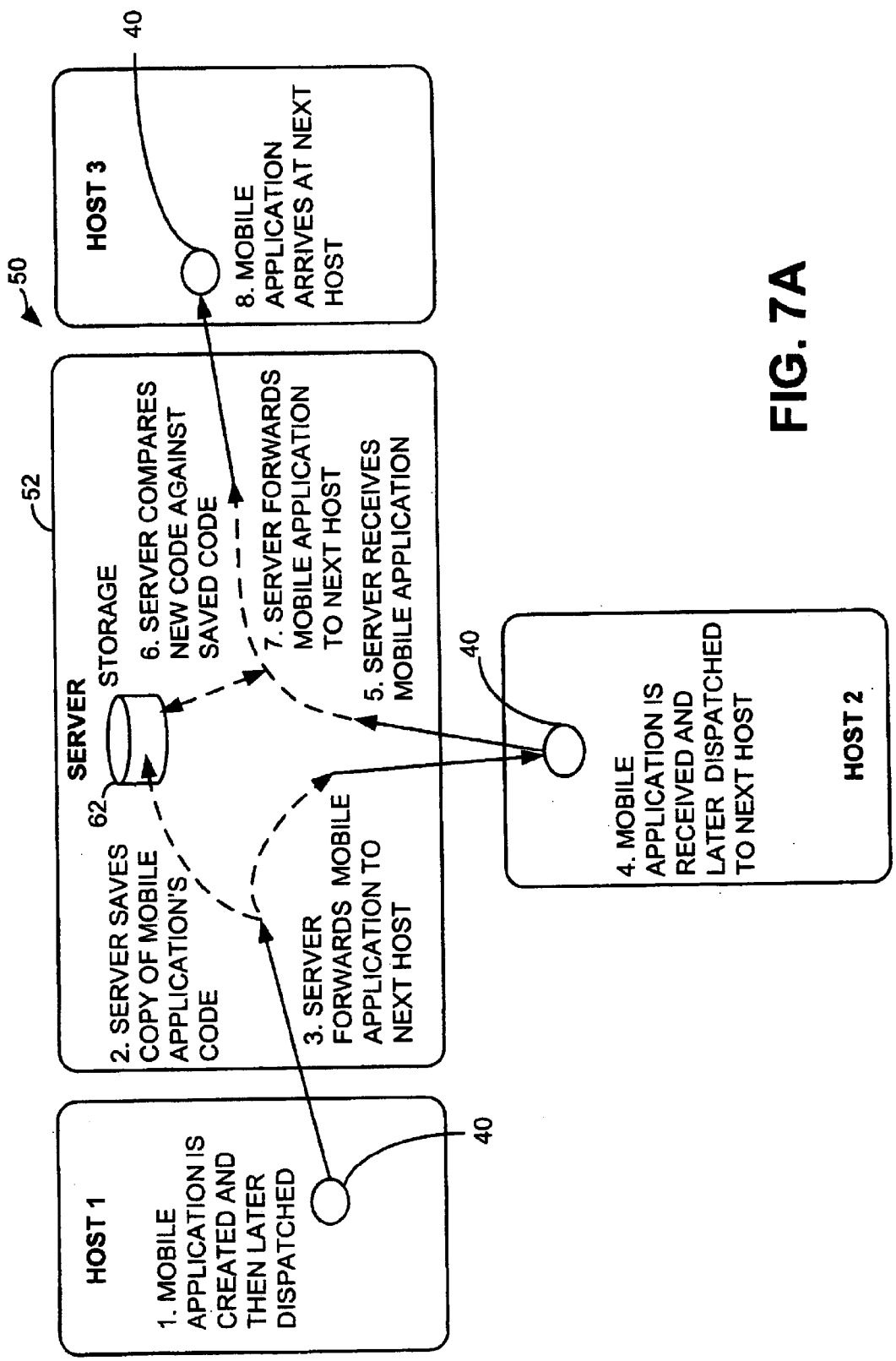
FIG. 7a is a diagram illustrating a first embodiment of the mobile application security system for detecting unwanted changes to the code of a mobile application in accordance with the invention.

FIG. 7a is a diagram illustrating a first embodiment of the mobile application security system 50 for detecting unwanted changes to the code of a mobile application in accordance with the invention. In particular, the mobile application 40 is created at and resides initially on Host1. In this example, the mobile application 40 is assumed to be marked as having immutable code. Host1 then dispatches the mobile application to Host2. In order to do that, the mobile application is directed to the server 52 that saves data that may be used to determine if the mobile application code has changed at any time. For example, a copy of the mobile application's code may be saved in a database, a checksum calculated based on the mobile application code may be saved in a database or any other technique may be used where the data may be used to compare two different instances of a software application or to compare the same software application at different times. In the alternative, for code or data of a mobile application that is marked as immutable, the server may assume that the code or data has been altered (without necessarily performing the comparison) and always replace the code or data with code or data that is known to be safe.

Next, the server forwards the mobile application to the next host (Host2 in this example). At Host2, the mobile application is received, executed and later dispatched to the next host (Host3 in this example). To transfer the mobile application to Host3, the server receives the mobile application again, stores data representing the mobile application at the current time and compares the data of the newly received mobile application with the original data it saved initially to check for various security problems and then, provided that the code has not changed, forwards the mobile application to Host3. The mobile application then arrives at Host3 which executes the mobile application. In summary, on each jump, the server can save data about the mobile application's code and, on subsequent jumps, the server can compare the previously saved data to the current data of the mobile application in order to ensure that nothing was added to or removed from the code of the mobile application. Now, a second embodiment of the security system in accordance with the invention will be described.

Prevent Untrusted Hosts from Forwarding Code

When a mobile application is dispatched to the server, one of three possible actions is taken:

a. If the host is not allowed to inject code into the system, and the mobile application has never been previously dispatched, then the server simply empties all of the mobile application's code from the mobile application's datastore and saves a copy of the mobile application's empty datastore for future use, and then forwards the mobile application to the next host.

b. If the host is not allowed to inject code into the system, and the mobile application has been dispatched in the past, then the server simply restores the mobile application's datastore to what was saved on the previous jump.

c. If the host is allowed to inject code into the system, then the server inspects the mobile application's ACL, as described next. FIGS. 8–11 illustrate examples of this process.

Figure 8:
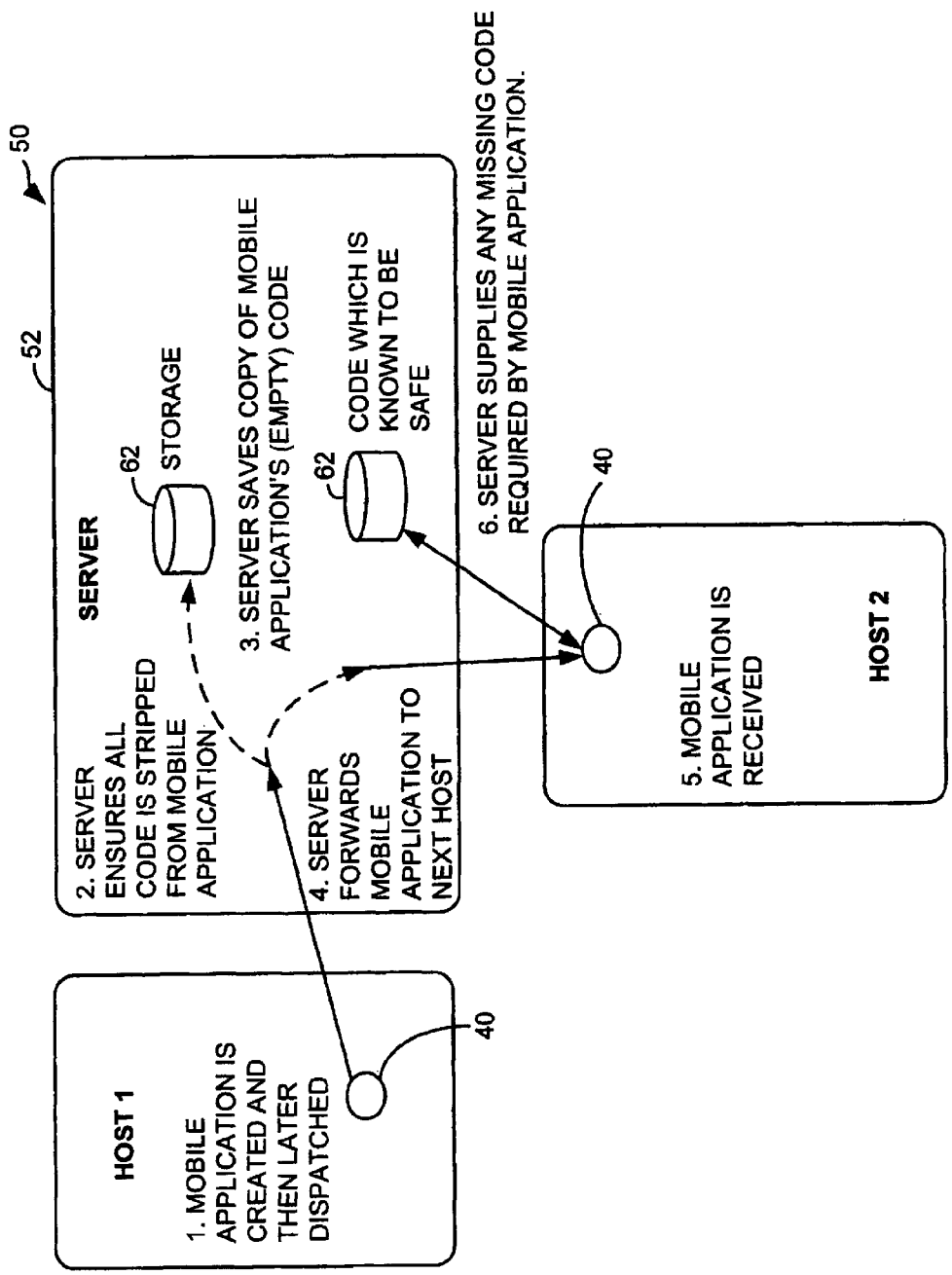
FIG. 8 is a diagram illustrating a first example of a second embodiment of the mobile application security system for preventing hostile hosts from transmitting code to other hosts in accordance with the invention.

FIG. 8 is a diagram illustrating a first example of a second embodiment of the mobile application security system 50 for preventing hostile hosts from transmitting code to other hosts in accordance with the invention. In particular, the mobile application 40 is created by Host1 and then later dispatched to another host to continue the execution of the mobile application. In this example, Host1 is untrusted in that the server 52 does not know whether or not to trust the host when interacting with the mobile application.

Therefore, the mobile application dispatched from Host1 is sent to the server 52 in accordance with the invention and the server may perform several security measures. For example, it may strip any code from the mobile application and store an (empty) copy of the mobile application code in the database 62. The server may alternatively check the code to ensure that it is safe and forward only safe code to the next host. The server may then forward the mobile application onto the next host, Host2 in this example. The mobile application may then be received by and executed by Host2. When the mobile application requires code for execution, the tested version of the code may be supplied to Host2 by the server 52 thus ensuring that the untrusted host cannot spread a virus, for example, using the mobile application. Now, the dispatch of a mobile application from a trusted host to another host will be described.

Figure 9:
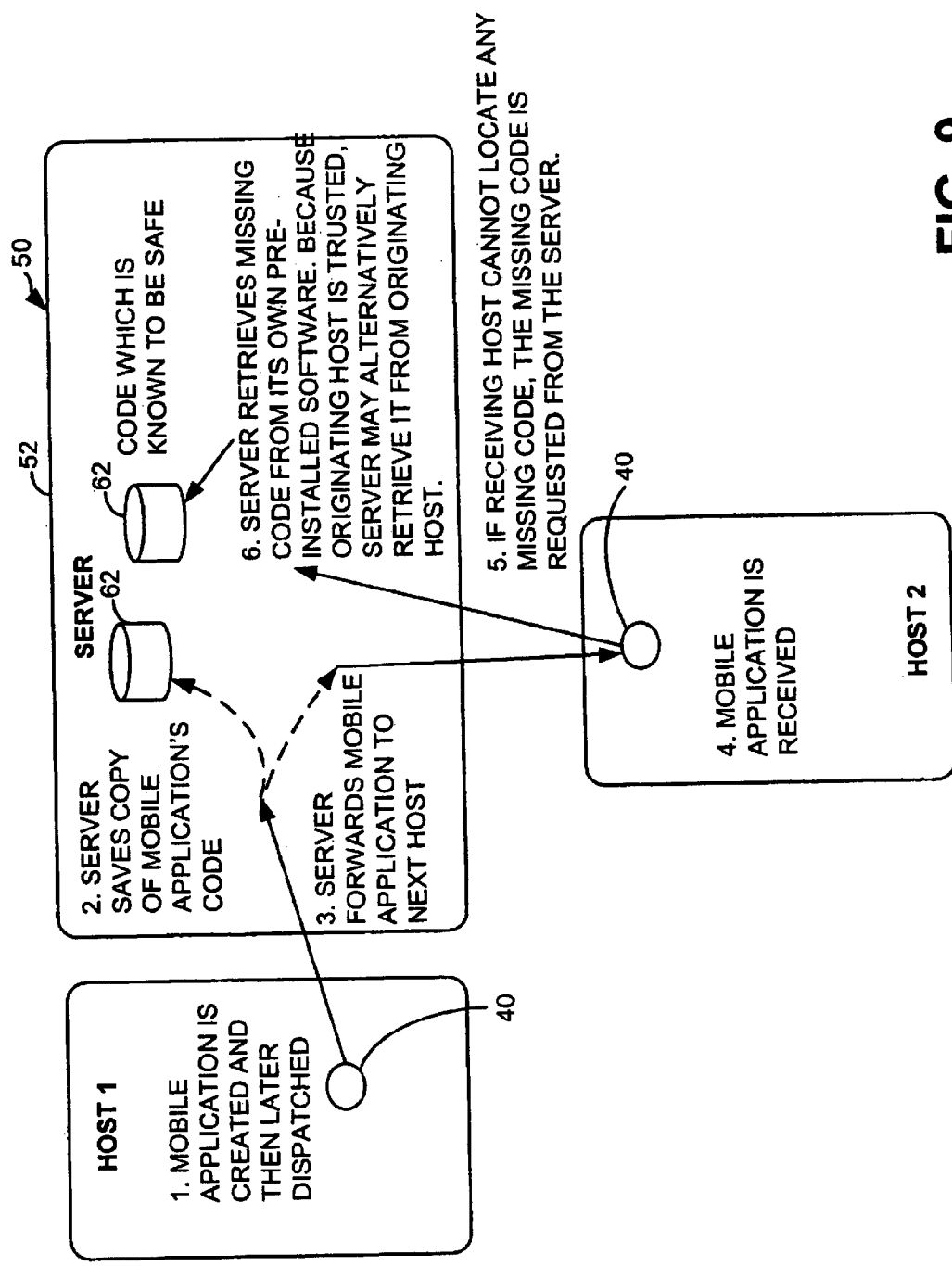
FIG. 9 is a diagram illustrating a second example of a second embodiment of the mobile application security system for preventing hostile hosts from transmitting code to other hosts in accordance with the invention.

FIG. 9 is a diagram illustrating a second example of a second embodiment of the mobile application security system 50 for preventing hostile hosts from transmitting code to other hosts in accordance with the invention. In particular, the mobile application 40 is created by Host1 and then later dispatched to another host to continue the execution of the mobile application. In this example, Host1 is trusted in that the server 52 knows that the particular host is trusted and therefore does not need to strip the code from the mobile application and test it as described above. Therefore, the mobile application dispatched from Host1 is sent to the server 52 in accordance with the invention and the server may store a copy of the mobile application code in the database 62. The server may then forward the mobile application onto the next host, Host2 in this example. The mobile application may then be received by and executed by Host2. When the mobile application requires code for execution, the known safe version of the code may be supplied to Host2 by the server 52 or, since the originating host is trusted, the code may be provided by the originating host. Now, the subsequent dispatch of a mobile application from an untrusted host will be described.

Figure 10:
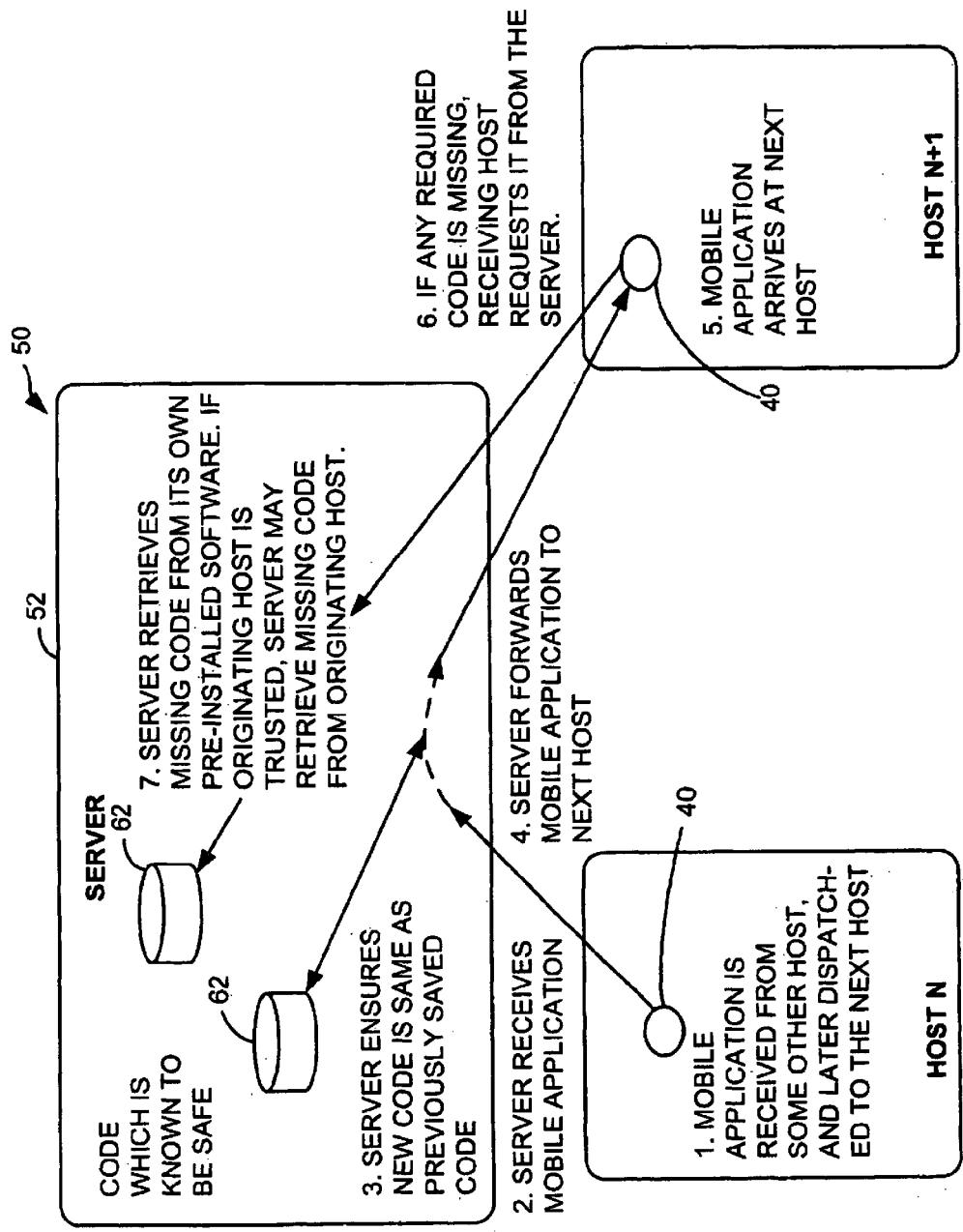
FIG. 10 is a diagram illustrating a third example of a second embodiment of the mobile application security system for preventing hostile hosts from transmitting code to other hosts in accordance with the invention.

FIG. 10 is a diagram illustrating a third example of a second embodiment of the mobile application security system 50 for preventing hostile hosts from transmitting code to other hosts in accordance with the invention. In particular, the mobile application 40 is received from another host by an untrusted host (Host n) and then later dispatched to another host to continue the execution of the mobile application. In this example, Host n is untrusted in that the server 52 does not know whether the particular host may perform nefarious acts on the mobile application or using the mobile application. Therefore, the mobile application dispatched from Host n is sent to the server 52 in accordance with the invention and the server may perform several security measures. For example, the server may receive the code of the mobile application and compare the current code to a previously stored version of the code to ensure that the newly received code is the same as the previous code. The server may then forward the mobile application onto the next host, Host n+1 in this example. The mobile application may then be received by and executed by Host n+1. When the mobile application requires code for execution, the known safe version of the code may be supplied to Host n+1 by the server 52 or, if the originating host is trusted the code may be provided by the originating host. Now, the subsequent dispatch of a mobile application from a trusted host will be described.

Figure 11:
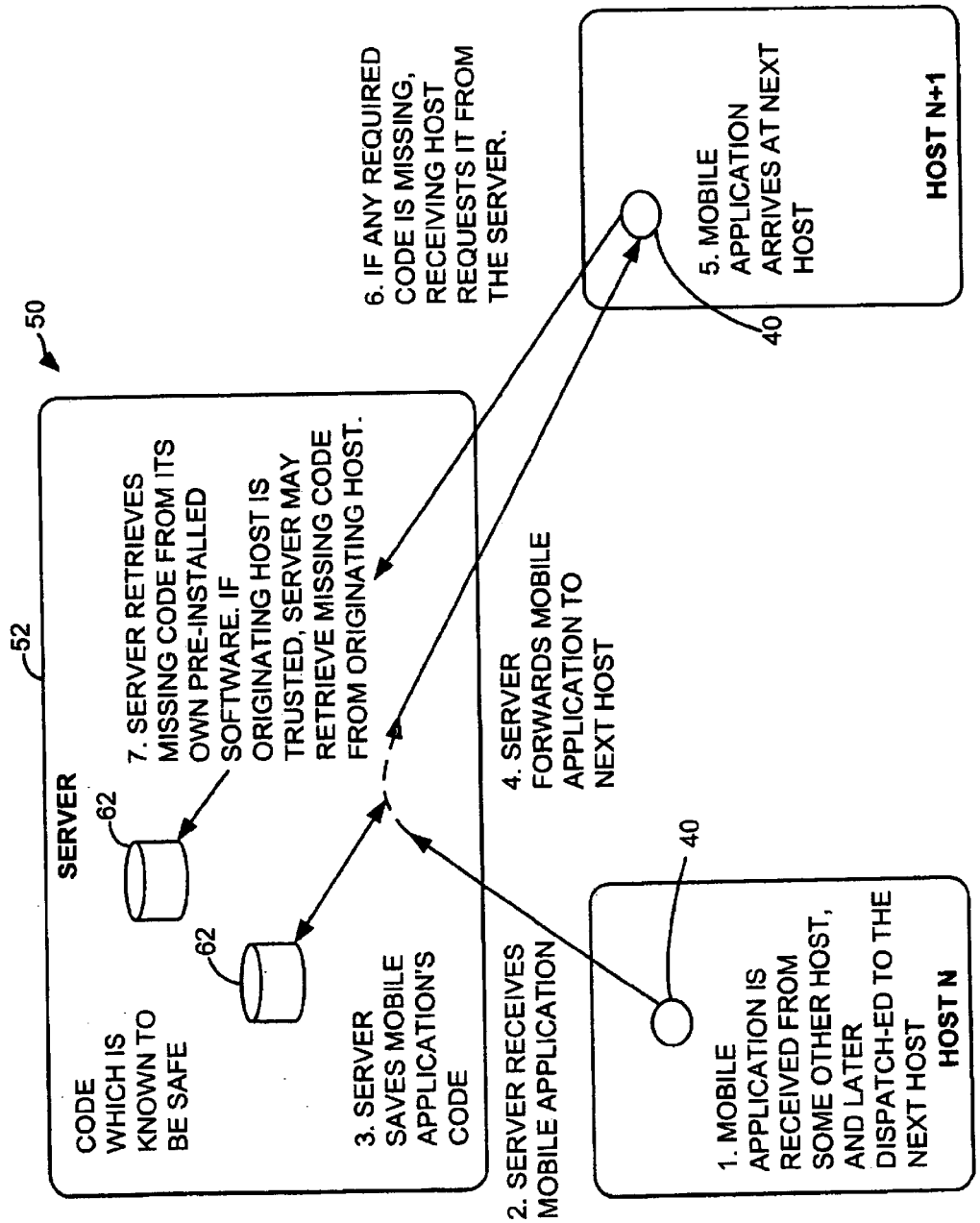
FIG. 11 is a diagram illustrating a fourth example of a second embodiment of the mobile application security system for preventing hostile hosts from transmitting code to other hosts in accordance with the invention.

FIG. 11 is a diagram illustrating a fourth example of a second embodiment of the mobile application security system 50 for preventing hostile hosts from transmitting code to other hosts in accordance with the invention. In particular, the mobile application 40 is received from another host by a trusted host (Host n) and then later dispatched to another host to continue the execution of the mobile application. In this example, Host n is trusted in that the server 52 knows that the particular host will not perform nefarious acts using the mobile application. Therefore, the mobile application dispatched from Host n is sent to the server 52 in accordance with the invention and the server may perform several security measures. For example, the server may receive the code of the mobile application and store a copy of it in the database 62. No comparison is necessary since the host is trusted. The server may then forward the mobile application onto the next host, Host n+1 in this example. The mobile application may then be received by and executed by Host n+1. When the mobile application requires the code for execution, the known safe version of the code may be supplied to Host n+1 by the server 52 or, if the originating host is trusted, the code may be provided by the originating host. Now, a third embodiment of the mobile application security system will be described.

Mark Mobile Applications as Having Immutable Code.

The Jumping Beans server may inspects each mobile application's Access Control List (ACL) to determine if the code in that mobile application is immutable. One of five possible actions is taken:

a. If the mobile application's code cannot be changed, and the mobile application has never been dispatched in the past, and the mobile application is being dispatched from a trusted host, then the server simply saves the mobile application's code for later use and the mobile application is forwarded to the next host in the itinerary.

b. If the mobile application's code cannot be changed, and the mobile application has never been dispatched in the past, and the mobile application is being dispatched from an untrusted host, then the server strips the mobile application's code from the mobile application and saves the mobile application's (empty) code for later use and the mobile application is forwarded to the next host in the itinerary.

c. If the mobile application's code cannot be changed, and the mobile application has been previously dispatched, then the server discards the mobile application's datastore, and inserts the datastore saved on the previous jump.

d. If the mobile application's code can be changed, then the server simply saves the mobile application's code and forwards the mobile application to the next host without altering its datastore.

e. If the mobile application's code cannot be changed (e.g., it is marked as immutable), then the server assumes that the code has been altered (without necessarily checking it) and replaces the code with code that is known to be safe.

Detect Unwanted Changes in the Mobile Application's State

Figure 12:
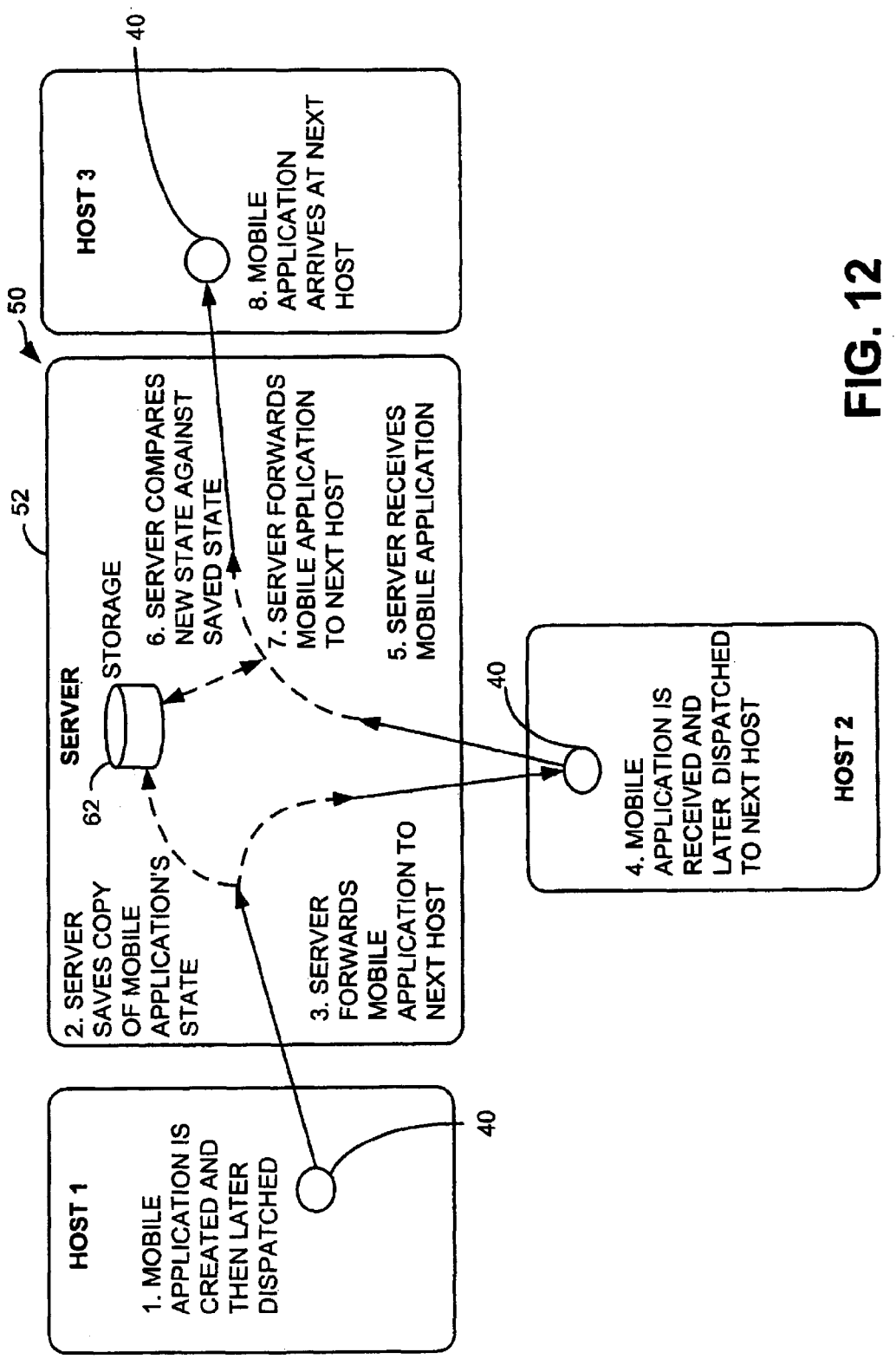
FIG. 12 is a diagram illustrating a third embodiment of the mobile application security system for detecting unwanted changes to the state of a mobile application in accordance with the invention.

The Jumping Beans server inspects each mobile application's Access Control List (ACL) to determine if the state of that mobile application is immutable. One of four possible actions is taken:

a. If the mobile application's state cannot be changed, and the mobile application has never been dispatched in the past, then the server saves the mobile application's state for later use and the mobile application is forwarded to the next host in the itinerary;

b. If the mobile application's state cannot be changed, and the mobile application has been previously dispatched, then the server discards the mobile application's state, and inserts the state saved on the previous jump.

c. If the mobile application's state can be changed, then the server simply saves the mobile application's state for later use and the mobile application is forwarded to the next host in the itinerary. FIG. 12 below illustrates an example of the process.

d. If the mobile application's state cannot be changed, the server may assume that the state has been altered (without necessarily checking it) and may replace the current state data with stored state data known to be safe.

FIG. 12 is a diagram illustrating a third embodiment of the mobile application security system 50 for detecting unwanted changes to the state of a mobile application in accordance with the invention. In general, the server 52 may compare the state of the mobile application on the previous jump with the state of the mobile application on the current jump. This allows the server to detect the unwanted changes in the state of the mobile application. In more detail, a host, Host1 in this example, may create a mobile application 40 that is then dispatched to other hosts for further execution. When the mobile application 40 is dispatched, it is sent to the server 52 which may save a copy of the mobile application's state. The server may then forward the mobile application to the next host, Host2 in this example. Host2 may receive the mobile application, execute it and then forward it onto the next host. The server may receive the mobile application from the next host and compare the state of the mobile application received from the next host to the state of the mobile application saved in the database to determine if changes have occurred. If the comparison does not detect any unwanted changes with the mobile application, the server may forward the mobile application onto the next host. Thus, in this embodiment, a host that executes the mobile application is unable to insert changes into the mobile application's state since those changes will be identified by the server when the comparison step is executed by the server. Now, a fourth embodiment of the mobile application security system will be described.

Enforcing a Mobile Application's Itinerary

Figure 13:
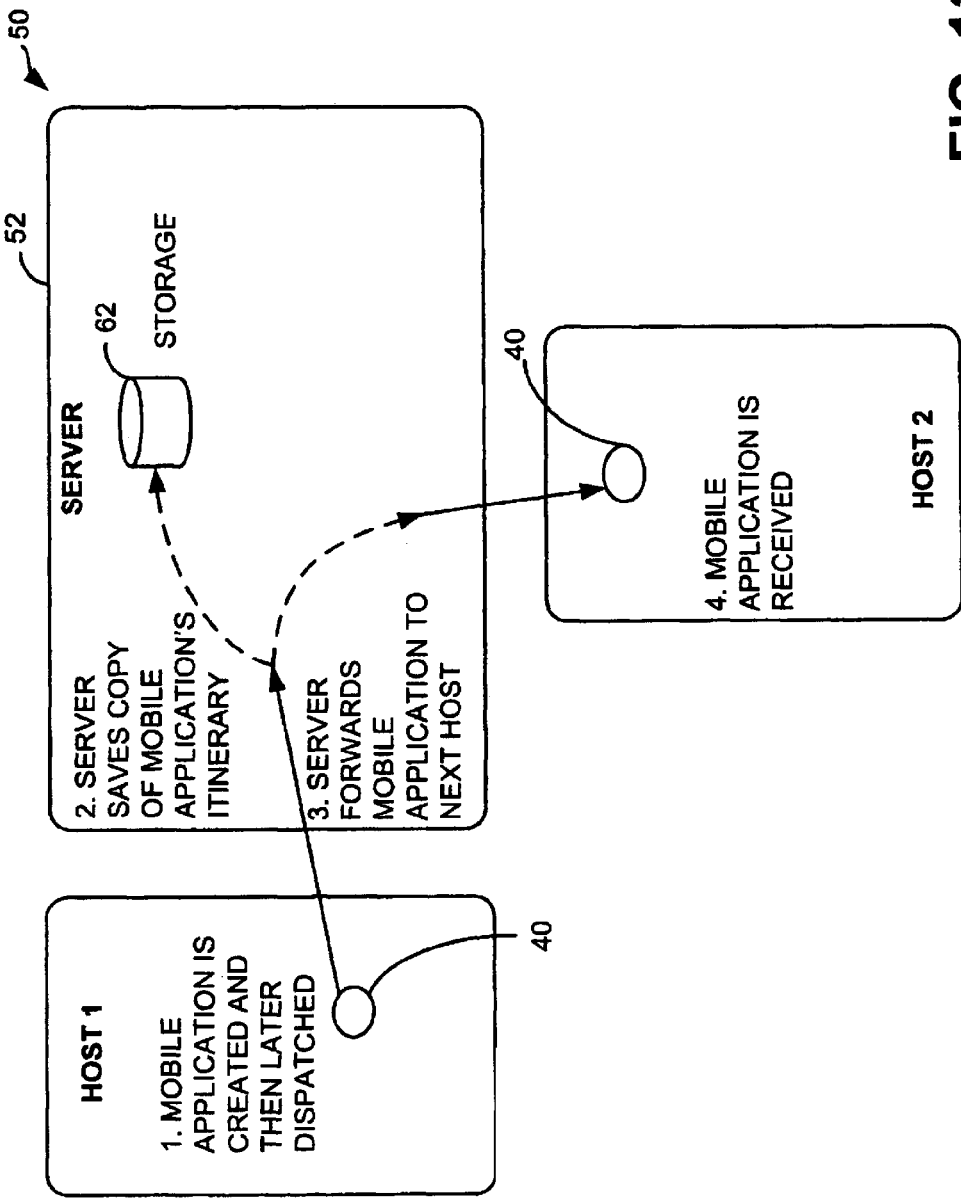
FIG. 13 is a diagram illustrating a first example of a fourth embodiment of the mobile application security system for detecting unwanted changes in the itinerary of the mobile application in accordance with the invention.
Figure 14:
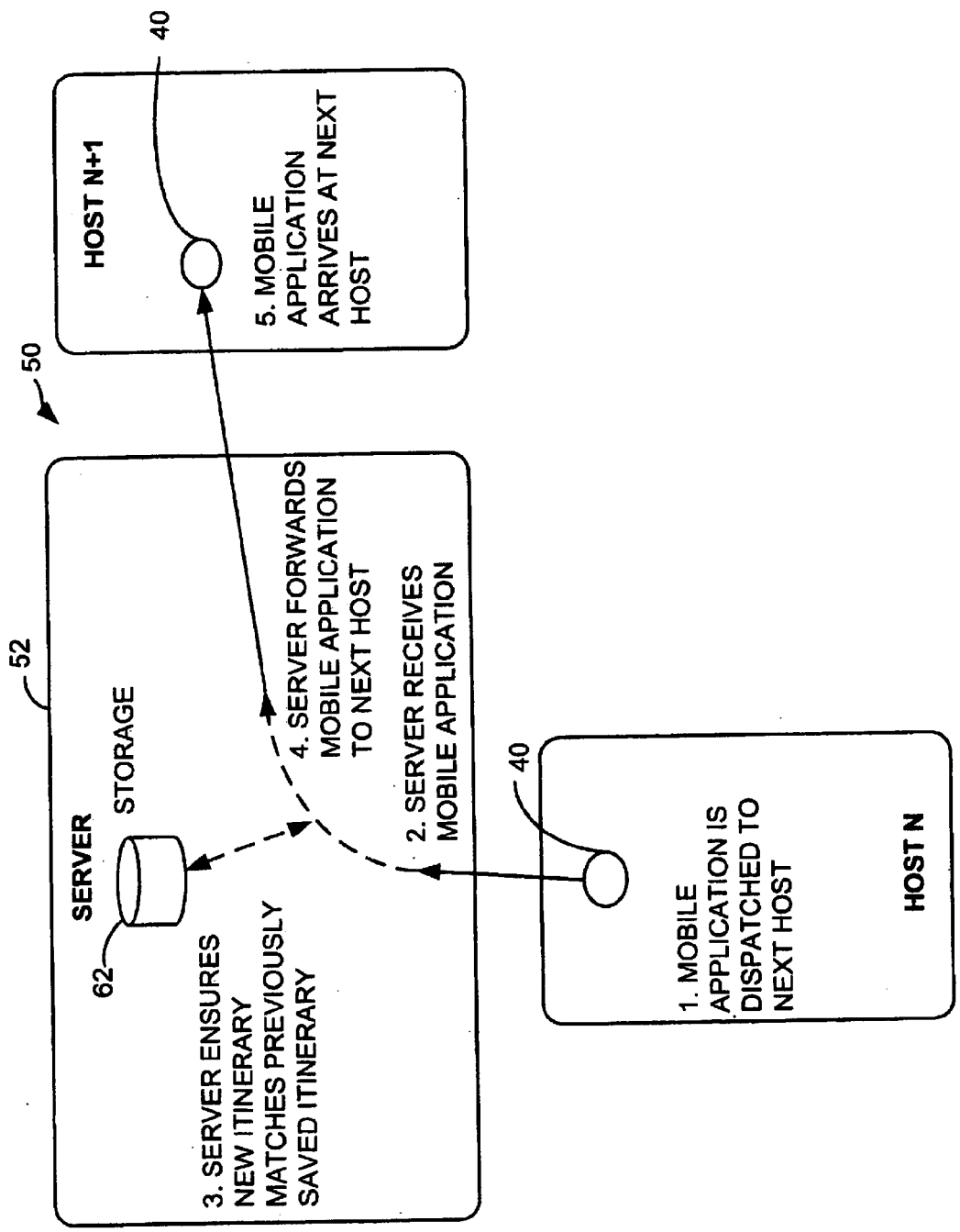
FIG. 14 is a diagram illustrating a second example of a fourth embodiment of the mobile application security system for detecting unwanted changes in the itinerary of the mobile application in accordance with the invention.
Figure 15:
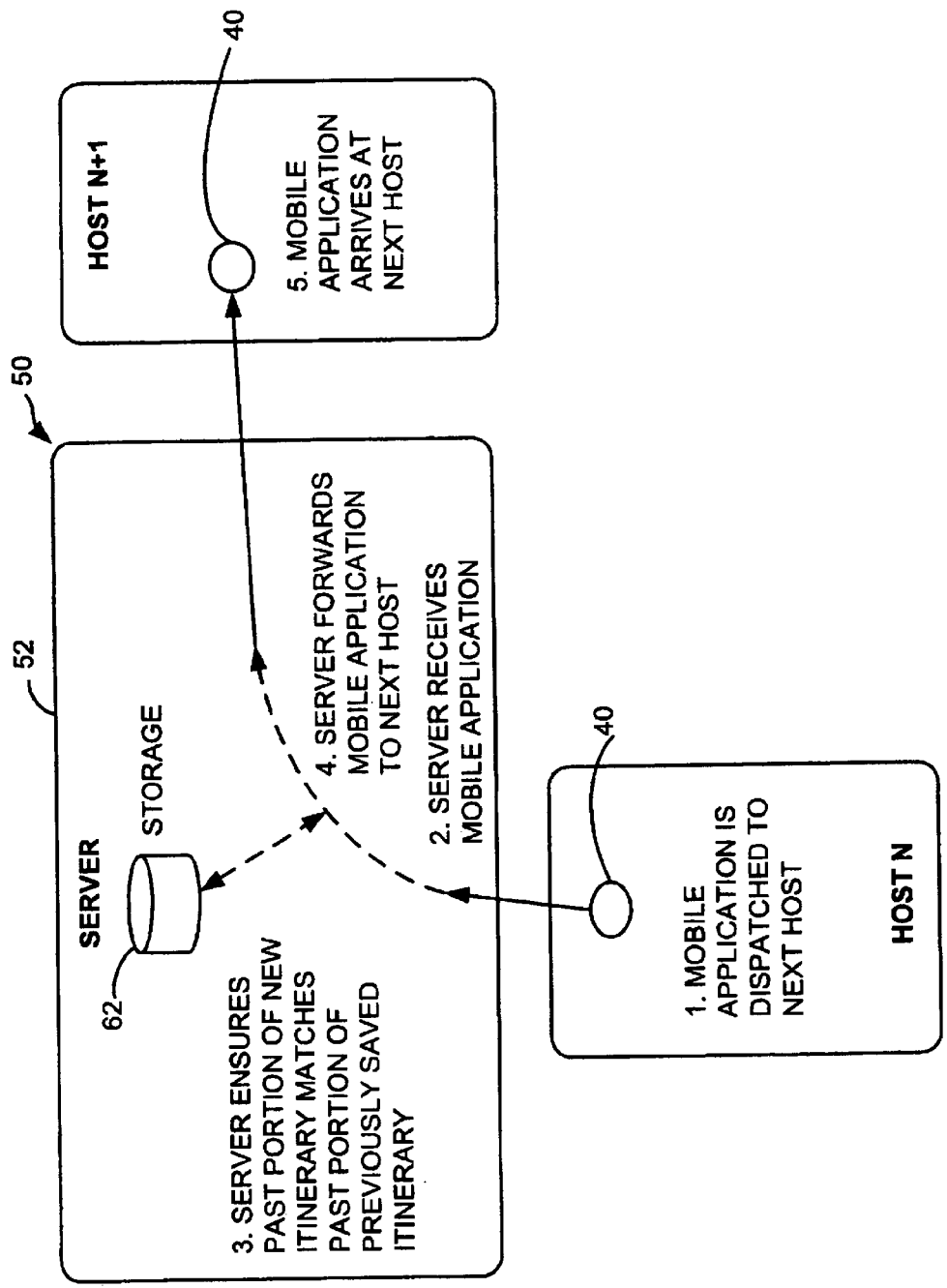
FIG. 15 is a diagram illustrating a third example of a fourth embodiment of the mobile application security system for detecting unwanted changes in the itinerary of the mobile application in accordance with the invention.

The ACL in a mobile application can indicate whether or not that mobile application's itinerary can be edited. Even if a mobile application's ACL indicates that the mobile application's itinerary can be edited, under no circumstances should that portion of an itinerary which represents the previous history of the mobile application ever be altered, nor should it ever be inaccurate. Because each mobile application must pass through the server on each jump, the server can accurately track the current and past locations of each mobile application. On a mobile application's first jump, the server simply saves that mobile application's entire itinerary for later use, and then forwards the mobile application to the next host. On subsequent jumps, the server inspects the mobile application's ACL, and handles the mobile application's itinerary in one of two ways:

a. If the mobile application's itinerary can be edited, the server simply ensures that the past itinerary accurately reflects the mobile application's past visits. If the mobile application's past itinerary does not match the server's record, a security exception is thrown.

b. If the mobile application's itinerary can not be edited, the server compares the mobile application's entire itinerary to the itinerary saved on the previous jump. If there is any difference, a security exception is thrown. In the alternative, the server may assume that the itinerary has been altered (without necessarily checking it) and replace it with an itinerary that is known to be safe. On every jump, the server saves each mobile application's entire itinerary for later use. FIGS. 13–15 illustrate examples of this process.

FIG. 13 is a diagram illustrating a first example of a fourth embodiment of the mobile application security system 50 for detecting unwanted changes in the itinerary of the mobile application in accordance with the invention. In general, on each jump of the mobile application, the server may determine the host from which the mobile application was dispatched and the hosts to which the mobile application is dispatched. In particular, this permits the server 52 to enforce the itinerary (e.g., the hosts where the mobile application is going to be executed) of the mobile application. In more detail, a first host (Host1) may create a mobile application 40 and then may dispatch the mobile application to another host through the server 52 in accordance with the invention. When the server receives the mobile application 40, the server 52 may store a copy of the itinerary of the mobile application in the database 62. The server may then forward the mobile application to the next host (Host2) according to the itinerary. Now, another example of the embodiment for detecting changes in the itinerary will be described.

FIG. 14 is a diagram illustrating a second example of a fourth embodiment of the mobile application security system 50 for detecting unwanted changes in the itinerary of the is already stored in the server. In more detail, a first host (Host n) may dispatch a mobile application 40 to another host through the server 52 in accordance with the invention. When the server receives the mobile application 40, the server 52 may compare the current itinerary of the mobile application to a stored copy of the itinerary to ensure they match each other. If the itineraries match, then the server may forward the mobile application onto the next host (Host n+1) that receives the mobile application and executes it. Now, another example of the embodiment for detecting changes in the itinerary will be described.

FIG. 15 is a diagram illustrating a third example of a fourth embodiment of the mobile application security system 50 for detecting unwanted changes in the itinerary of the mobile application in accordance with the invention wherein the itinerary may be changed. In more detail, a first host (Host n) which has received a mobile application 40 from another host may dispatch the mobile application. The mobile application then passes through the server 52 in accordance with the invention. When the server receives the mobile application in accordance with the invention, it may ensure that the historical portion of the itinerary is accurate by comparing the previously saved itinerary with the new itinerary. If the historical portion of the itinerary is accurate, the server forwards the mobile application to the next host (Host n+1). Now, a fifth embodiment of the mobile application security system will be described.

Figure 16:
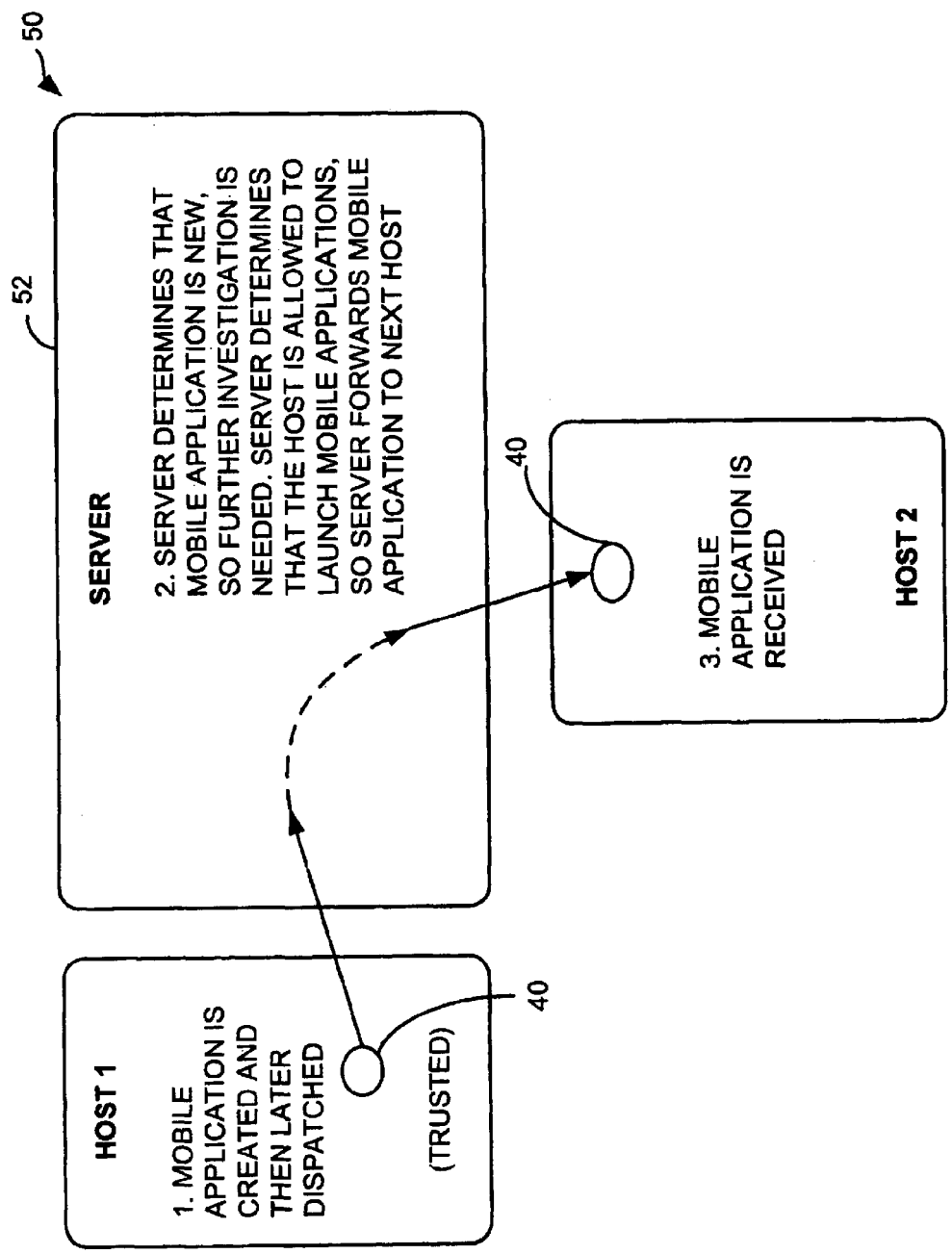
FIG. 16 is a diagram illustrating a first example of a fifth embodiment of the mobile application security system for preventing untrusted hosts from launching a mobile application in accordance with the invention.

FIG. 16 is a diagram illustrating a first example of a fifth embodiment of the mobile application security system 50 for preventing untrusted hosts from launching a mobile application in accordance with the invention. In general, on each jump of the mobile application, the server may determine if the mobile application has previously been in the system. For example, if the host from which the mobile application is sent is an untrusted host, the server may prevent the mobile application from being forwarded to the next host. In more detail, as shown in FIG. 16, a first host (Host1) may create a mobile application 40 and then later dispatch it to another host. In accordance with the invention, the dispatched mobile application first is sent to the server 52. The server 52 may determine that the mobile application is new and therefore further investigation is necessary. If the server then determines that the particular host is allowed (e.g., is trusted to) to launch mobile applications, the server may forward the mobile application to the next host (Host2) so that Host2 receives the mobile application.

Figure 17:
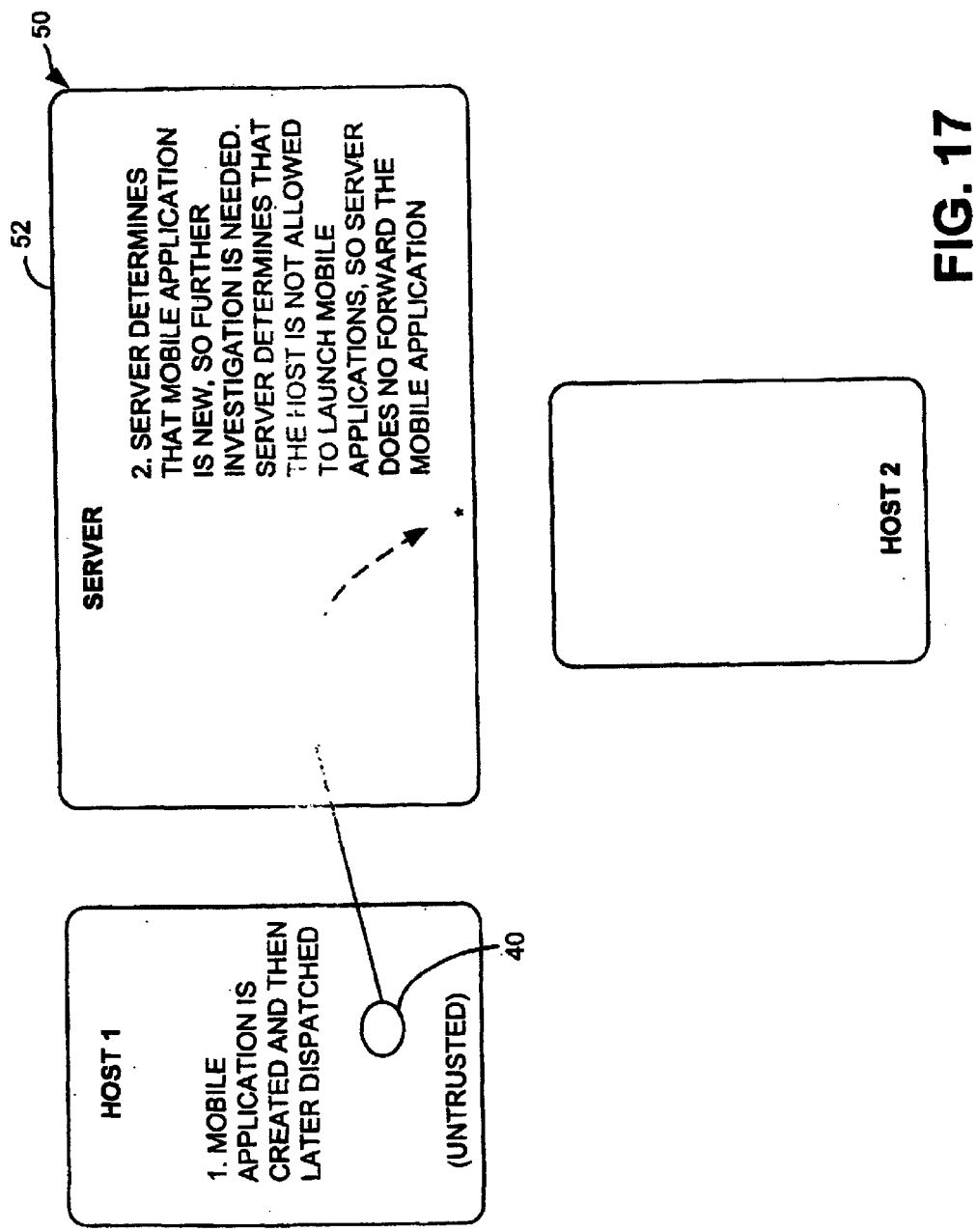
FIG. 17 is a diagram illustrating a second example of a fifth embodiment of the mobile application security system for preventing untrusted hosts from launching a mobile application in accordance with the invention.

FIG. 17 is a diagram illustrating a second example of a fifth embodiment of the mobile application security system 50 for preventing untrusted hosts from launching a mobile application in accordance with the invention. In particular, an untrusted host (Host1) may create a new mobile application that is then later dispatched. The mobile application is then sent dispatched to the server 52 first in accordance with the invention. The server 52 determines that the host dispatching the mobile application is untrusted so that the server does not forward the mobile application to the next host.

Figure 18:
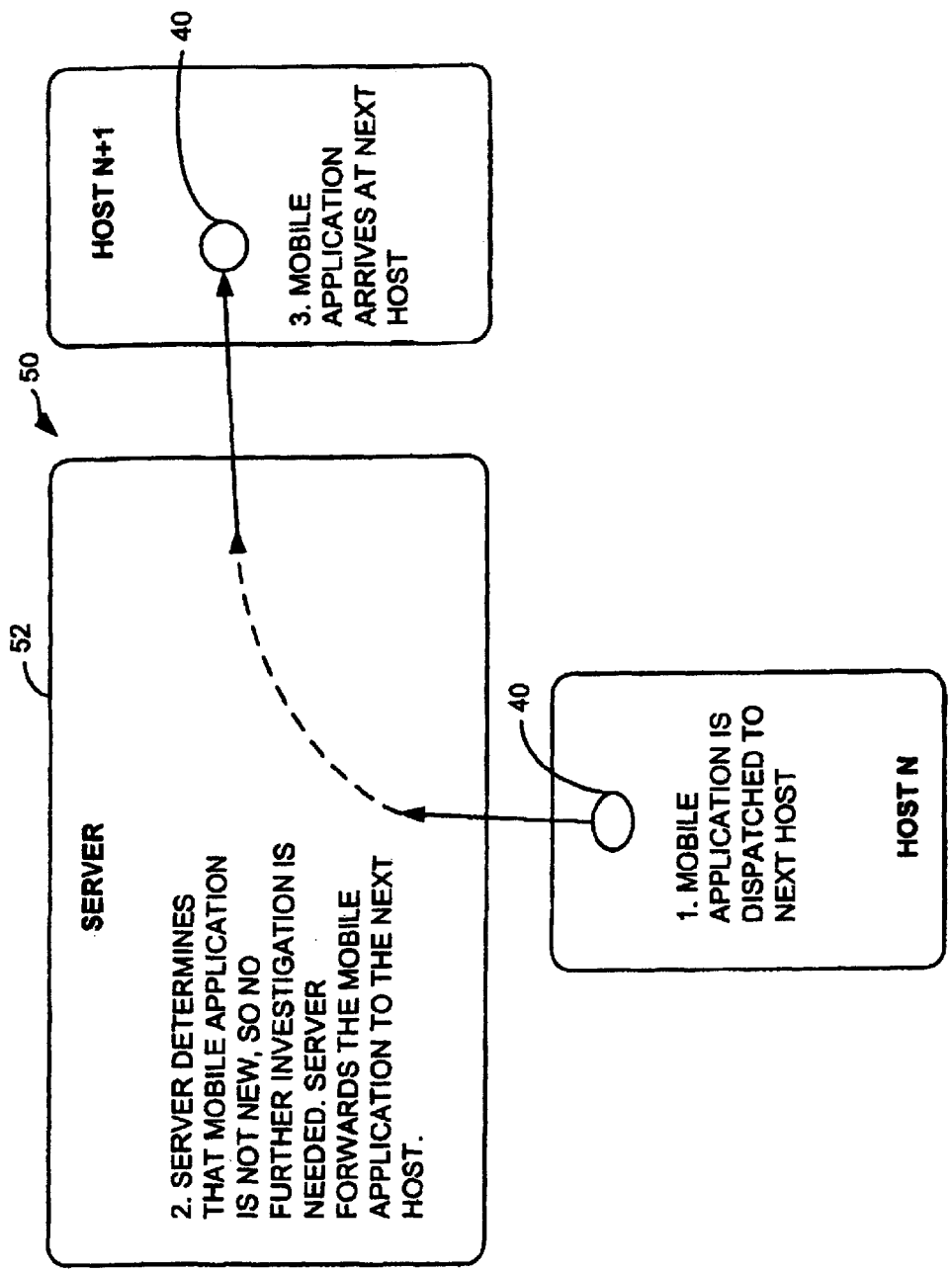
FIG. 18 is a diagram illustrating a third example of a fifth embodiment of the mobile application security system for preventing untrusted hosts from launching a mobile application in accordance with the invention.

FIG. 18 is a diagram illustrating a third example of a fifth embodiment of the mobile application security system 50 for preventing untrusted hosts from launching a mobile application in accordance with the invention wherein a subsequent dispatch of the mobile application occurs. In particular, a host (Host n) attempts to dispatch a mobile application to another host which must pass through the server 52 in accordance with the invention. When the mobile application is received by the server, the server may determine that the mobile application is not new (e.g., the server knows about the mobile application and knows that it is safe) and forwards the mobile application to the next host (Host n+1). Now, a summary of how the above procedures raise the security level of a mobile application environment will be described.

The most serious security problem perceived by industry observers is that a mobile application system allows a hostile host to inject dangerous code into a computing system, and there is no way to detect this. By marking a host so that it is not allowed to inject code into the system, the other hosts in the mobile application system do not have to trust any code originating from that host. Instead, they only need to trust the server in accordance with the invention.

Another security problem often cited by industry observers is that an hostile host can modify the code of the mobile application to give it undesirable behavior, then forward the mobile application other hosts in the system. Most (but not all) mobile applications, as deployed in real-world systems, will have fixed code, meaning that the code will not change during the lifetime of the mobile application. Virtually all mobile applications can be designed so that they do not require that the code change. On creation, a mobile application's ACL can be set up so that its code cannot be altered in accordance with the invention. This prevents an hostile host from modifying a mobile application's code and forwarding that modified code to other hosts. A few (but not many) mobile applications will not need to alter their state during their life-time. When creating the mobile application, the ACL can be set up so that its state cannot be altered in accordance with the invention.

Another security concern often cited by industry observers is that an hostile host can tamper with a mobile application in an unwanted way, and then forward that contaminated mobile application to other hosts. This problem is a superset of the problem above. As described above, the security technology described in this can protect a mobile application's code. The two remaining major pieces of a mobile application are its state and its itinerary. As described elsewhere in this document, a mobile application's itinerary can be protected from an hostile host. The only possible remaining method of attack by a hostile host is to alter the mobile application's state. Once a mobile application's code and itinerary are protected, the problem is reduced to the exact same problem faced by distributed computing systems which don't use mobility. Systems which don't use mobility are passing around simple data. As this data is passed around, the pre-installed software on the different computers will respond to, alter, and otherwise process this data. The state of a mobile application is just data, exactly the same as the data passed around in traditional computing systems. Basically, a mobile application system can be secured by applying the technology described herein. Now, possible responses by the mobile application security system to security violations will be described.

In one embodiment, the server could accept the mobile application from the sending host and then destroy the mobile application. In another embodiment, the server could perform the security procedures before acknowledging receipt of the mobile application. If the security procedures fail, the server could reject the mobile application and leave it on the offending host. In yet another embodiment, the server could correct the violation, and then forward the mobile application to the next host although this is not possible for all types of security violations. In all cases where the security procedures fail, the server should record such events in the audit logs.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A mobile application security system, comprising:
   a central computer, in communication with a first host computer and a second host computer, the first and second host computers executing a mobile application that jumps between the first and second host computers during execution and passes through the central computer,
   the central computer further comprising means for monitoring the security of the mobile application as the mobile application jumps between the first and second host computers
   the means for monitoring further comprising, means for inspecting an access control list of the mobile application to determine if code of the mobile application is marked as immutable, and means for replacing immutable code with code known by the central computer to be safe.

2. A system, comprising:
   a server, in communication with a first host computer and a second host computer, the first and second host computers executing a mobile application that jumps between the first and second host computers during execution, passing through the server, the server inspecting an access control list of the mobile application to determine if data of the mobile application is marked as immutable and replacing immutable data with data known by the central computer to be safe to monitor security of the mobile application as the mobile application jumps between the first and second host computers.

3. The system of claim 2, wherein the data of the mobile application is one from the group containing code, state data and itinerary data.

4. The system of claim 2, wherein the server saves immutable data when the mobile application has not been dispatched in the past and a host dispatching the mobile application is trusted.

5. The system of claim 2, wherein the server strips immutable data when the mobile application has not been dispatched in the past and a host dispatching the mobile application is not trusted.

6. The system of claim 2, wherein the server saves data not marked as immutable when a host dispatching the mobile application is trusted.

7. The system of claim 2, wherein the server replaces immutable data when the mobile application has been dispatched in the past.

8. The system of claim 2, wherein the server forwards the mobile application to a receiving host.

9. A method at a server, comprising:

monitoring security of a mobile application as the mobile application jumps between a first host and a second host including:

inspecting an access control list of the mobile application to determine if data of the mobile application is marked as immutable; and replacing immutable data with data known to be safe.

10. The method of claim 9, wherein the data of the mobile application is one from the group containing code, state data and itinerary data.

11. The method of claim 9, further comprising:

saving immutable data when, the mobile application has not been dispatched in the past and a host dispatching the mobile application is trusted.

12. The method of claim 9, wherein replacing comprises replacing immutable data when the mobile application has not been dispatched in the past and a host dispatching the mobile application is not trusted.

13. The method of claim 9, further comprising:

saving data not marked as immutable when a host dispatching the mobile application is trusted.

14. The method of claim 9, wherein replacing comprises replacing immutable data when the mobile application has been dispatched in the past.

15. The method of claim 9, further comprising:

forwarding the mobile application to a receiving host.

16. A mobile application security system, comprising:

a central computer, in communication with a first host computer and a second host computer, the first and second host computers executing a mobile application that jumps between the first and second host computers during execution, passing through the central computer, the central computer further comprising means for monitoring security of the mobile application as the mobile application jumps between the first and second host computers the means for monitoring further comprising, means for inspecting an access control list of the mobile application to determine if state data of the mobile application is marked as immutable, and means for replacing immutable state data of the mobile application with state data known by the central computer to be safe.

17. A mobile application security system, comprising:

a central computer, in communication with a first host computer and a second host computer, the first and second host computers executing a mobile application that jumps between the first and second host computers during execution, passing through the central computer, the central computer further comprising means for monitoring security of the mobile application as the mobile application jumps between the first and second host computers the means for monitoring further comprising, means for inspecting an access control list of the mobile application to determine if itinerary data of the mobile application is marked as immutable, and means for replacing immutable itinerary data with itinerary data known by the central computer to be safe.

18. The system of claim 17, wherein the itinerary data comprises past historical itinerary data.

19. A mobile application security method, comprising:

receiving a mobile application at a central computer each time the mobile application is jumping between a first host and a second host; and monitoring security of the mobile application as it jumps between the first and second hosts, including inspecting an access control list of the mobile application to determine if code of the mobile application is marked as immutable, and replacing immutable code with code known by the central computer to be safe.

20. A mobile application security method, comprising:

receiving a mobile application at a central computer each time the mobile application is jumping between a first host and a second host; and monitoring security of the mobile application as it jumps between the first and second hosts, including inspecting an access control list of the mobile application to determine if state data of the mobile application is marked as immutable, and replacing immutable state data with state data that is known by the central computer to be safe.

21. A mobile application security method, comprising:

receiving a mobile application at a central computer each time the mobile application is jumping between a first host and a second host; and monitoring security of the mobile application as it jumps between the first and second hosts, including inspecting an access control list of the mobile application to determine if itinerary data of the mobile application is marked as immutable, and replacing immutable itinerary data with itinerary data known by the central computer to be safe.

22. The method of claim 20, wherein the itinerary data comprises past historical itinerary data.

23. A mobile application security method, comprising:

receiving a mobile application at a central computer each time the mobile application is jumping between a first host and a second host; and monitoring security of the mobile application as it jumps between the first and second hosts, including saving code of the mobile application when the code is marked as immutable, the mobile application has not been dispatched in the past and a host dispatching the mobile application is trusted, stripping the code from the mobile application when the code is marked as immutable, the mobile application has not been dispatched in the past and the host dispatching the mobile application is not trusted, replacing the code of the mobile application when the code is marked as immutable and the mobile application has been dispatched in the past, and saving the code of the mobile application when the code is not marked as immutable.

24. A mobile application security system, comprising:

a central computer, in communication with a first host computer and a second host computer, the first and second host computers executing a mobile application that jumps between the first and second host computers during execution and passes through the central computer, the central computer further comprising means for monitoring security of the mobile application as the mobile application jumps between the first and second host computers the security monitoring means further comprising means for saving code of the mobile application when the code is marked as immutable, the mobile application has not been dispatched in the past and a host dispatching the mobile application is trusted, means for stripping the code from the mobile application when the code is marked as immutable, the mobile application has not been dispatched in the past and the host dispatching the mobile application is not trusted, means for replacing the code of the mobile application when the code is marked as immutable and the mobile application has not been dispatched in the past, and means for saving the code of the mobile application when the code is not marked as immutable.

* * * * *